(12) United States Patent
Freerksen et al.

(10) Patent No.: US 6,314,491 B1
(45) Date of Patent: Nov. 6, 2001

(54) PEER-TO-PEER CACHE MOVES IN A MULTIPROCESSOR DATA PROCESSING SYSTEM

(75) Inventors: Donald Lee Freerksen, Rochester; Gary Michael Lippert, Kasson; John D. Irish, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/259,950

(22) Filed: Mar. 1, 1999

(51) Int. Cl.[7] .................................................. G06F 12/12
(52) U.S. Cl. ............................... 711/124; 712/28; 711/156
(58) Field of Search ............................... 712/28; 711/202, 711/141, 143, 146, 122, 156, 113, 124

(56) References Cited

U.S. PATENT DOCUMENTS

| | | | |
|---|---|---|---|
| 5,394,555 | 2/1995 | Hunter et al. | 395/800 |
| 5,510,934 | 4/1996 | Brennan et al. | 395/446 |
| 5,535,116 | 7/1996 | Gupta et al. | 364/134 |
| 5,542,062 | 7/1996 | Taylor et al. | 395/403 |
| 5,584,013 | 12/1996 | Cheong et al. | 395/449 |
| 5,590,310 | 12/1996 | Willenz et al. | 395/473 |
| 5,604,882 | 2/1997 | Hoover et al. | 395/448 |
| 5,644,752 | 7/1997 | Cohen et al. | 395/449 |
| 5,649,154 | 7/1997 | Kumar et al. | 395/449 |
| 5,651,137 | 7/1997 | MacWilliams et al. | 395/468 |
| 5,652,859 | 7/1997 | Mulla et al. | 395/473 |
| 5,666,514 | 9/1997 | Cheriton | 711/144 |
| 5,671,391 | 9/1997 | Knotts | 395/470 |
| 5,680,572 | 10/1997 | Akkary et al. | 395/453 |
| 5,706,464 | 1/1998 | Moore et al. | 395/449 |
| 5,713,004 * | 1/1998 | Kimmel | 711/145 |
| 5,717,893 | 2/1998 | Mattson | 395/456 |
| 5,724,550 | 3/1998 | Stevens | 395/473 |
| 5,815,648 * | 9/1998 | Giovannetti | 714/5 |
| 5,987,571 * | 11/1999 | Shibata | 711/141 |
| 6,122,712 * | 9/2000 | Torii | 711/141 |
| 6,125,436 * | 9/2000 | Bertone | 711/202 |
| 6,128,677 * | 10/2000 | Miller | 710/40 |

OTHER PUBLICATIONS

Freerksen; Irish; Grosbach; Paulson; Mounes–Toussi, *Multi–Entry Fully Associative Transition Cache*, Patent Application Serial No. 08/761,378; Filed Dec. 9, 1996.

* cited by examiner

*Primary Examiner*—Eric Coleman
(74) *Attorney, Agent, or Firm*—Wood, Herron & Evans

(57) ABSTRACT

A memory cache system is used in a multiprocessor environment. The first processor accesses data using a first level 1 cache, and the second processor accesses data using a second level 1 cache. A storage control circuit is positioned between the first and second level 1 caches and a level 2 cache and main memory. The level 2 cache maintains copies of data in main storage and further maintains an indication of those level 1 caches having copies of data and whether those copies have been modified. When a processor accesses data that is not resident in the connected level 1 cache, a request is delivered to the level 2 cache for this data. The level 2 cache then determines whether it can return a copy of the data to the level 1 cache or must access the data from main memory. Also, when the level 2 cache determines that another level 1 cache is storing a modified copy of the data, the level 2 cache returns to the storage control circuit a pointer to the level 1 cache having the modified copy of the data; the storage control circuit then causes the level 1 cache having a modified copy of the data, to transfer the modified data to the requesting level 1 cache without returning the data to the level 2 cache or main memory. This ameliorates the effects of repeated writes to the same data by the multiple processors.

22 Claims, 15 Drawing Sheets

PEER-TO-PEER CACHE MOVES IN A MULTIPROCESSOR DATA PROCESSING SYSTEM

FIELD OF THE INVENTION

The present invention relates to management of a memory cache system in a manner which improves cache performance.

BACKGROUND OF THE INVENTION

In a data processing system, instructions and associated data are transferred from memory to one or more processors for processing, and then resulting data generated by the processor is returned to memory for storage. Thus, typical processing operations involve frequent and repetitive reading and writing from memory. As a result, memory access delays are often a primary limitation in the performance of a data processing system. Preferably, therefore, memory access speed should be maximized to maximize performance. However, often cost and other constraints require that the main memory be comprised of relatively long access time circuitry. To overcome the resulting performance drawbacks, memory caches are typically used.

A memory cache typically includes a relatively small, but high speed, bank of memory, which can be more rapidly accessed by the processor(s) than the main memory. Memory locations in the main memory are duplicated in the cache. When a particular memory location being accessed by the processor is duplicated in the cache —event which is known as a cache "hit"—the processor may rapidly access the cache instead of waiting for access to main memory. The cache is managed with the goal of maximizing the fraction of accesses which are hits in the cache.

Caches are typically organized into "lines", which are relatively long sequences of memory locations found in main memory. Typically, when a memory location accessed by a processor is not duplicated in the cache—an event which is known as a cache "miss"—an entire line containing the missed memory location, and neighboring memory locations, is brought into the cache as part of retrieving the missed location from other caches or main memory—an event which is known as a "linefill" into the cache.

Typically, each cache line is associated with multiple groups of locations in the main memory. Each cache line stores duplicates of associated groups of memory locations, as well an indication of which groups of memory locations are currently stored in that line. Thus, when a processor requests access to a particular memory location, the cache line corresponding to that memory location is accessed to determine whether that cache line is storing the group of memory locations which includes the requested location. If so, the requested memory location is accessed in the cache. If not, a group of memory locations including the requested location is linefilled into the cache.

Typically, an n-way associative cache stores n of the several groups of locations corresponding to a cache line in the cache at one time. When a group of memory locations is linefilled into the cache, memory contents in the same cache location may need to be replaced. If the contents of the replaced cache line have been modified, then the line has to be stored back into the corresponding group of locations in the main memory—an event which is known as a "castback" or "writeback" from the cache.

In high performance data processing systems, often there are two or more caches, organized so that a processor attempts to access a memory location by first attempting to locate a duplicate of that location in a "level 1" or L1 cache. If there is a miss in the L1 cache, then an attempt is made to locate a duplicate of the desired memory location in a "level 2" or L2 cache. If there is a miss in the L2 cache, each lower level cache is sequentially checked in the same manner. If there is a hit in one of the caches, then the desired memory locations are obtained from that cache, and typically, the accessed memory locations are duplicated, along with neighboring locations completing a cache line, into the appropriate location of at least the L1 cache —although in some cases an access may be "cache-inhibited", in which case the data is not stored in the L1 cache after retrieval. If there are misses in all of the caches, the missed location, along with neighboring locations completing a cache line, is retrieved from main memory, and filled into one or more of the caches if the access is not cache-inhibited. Similarly, if a line is cast back from a cache, the line may be written to a higher level cache, main memory, or both.

Typically, lines of instructions and data are transferred from caches and processors to other caches and processors using buffers. For instance, in one architecture two buffers are respectively connected to a level 1 cache and a level 2 cache. These buffers are also connected to main memory, a host processor, and possibly other processors via a system bus. The buffers allow for a smooth transition of data or instructions between components having different transfer rates.

In multiprocessor systems, often one or more lower level caches or the main memory is shared by multiple processors. In such an environment, care must be taken that when the data is modified by a processor, the modifications are returned to the shared cache or memory before another processor accesses the data, so that processors do not perform operations on data which has not been updated. Typically, in such an environment, before a processor can modify data, it must request ownership of that data. Once ownership of the data is granted to a processor, that processor has exclusive access to the data, and other processors are prevented from accessing or modifying the data until it is written back to the shared cache or memory. If a first processor seeks to access data that is held exclusively by a second processor, the first processor requests ownership of the data; as a consequence, the second processor is forced to write the data back to the shared cache or data, and then data is then delivered to the first processor.

This typical structure can lead to inefficiencies in particular situations, for example, where two processors are simultaneously writing to the same data. In such a situation, the first processor will obtain ownership of the data to write to the data. Then, the second processor will request ownership in order to write to the data, forcing the first processor to write the data back to the shared cache or memory so that the data can be delivered to the second processor in an exclusive state. Then the first processor will request ownership in order to write to the data, forcing the second processor to write the data back to the shared cache or memory so that the data can be delivered to the first processor in an exclusive state. This exchange will repeat as long as both processors are attempting to write to the data, leading to an excessive amount of writebacks to the shared cache or memory and reduction in performance.

Accordingly, there is a need for a cache which is managed in a manner to improve its performance, particularly in a multiprocessor environment.

SUMMARY OF THE INVENTION

In accordance with principles of the present invention, a memory cache system is used in a multiprocessor environment having first and second processors. The first processor accesses data using a first cache and shared lower level storage, and the second processor accesses data using a second cache and the shared lower level storage. A storage control circuit is positioned between the first and second caches and the lower level storage. When the first or second processor accesses data that is not resident in the respective first or second cache, a request is delivered to the storage control circuit for this data. To ameliorate the effect of repeated writes to the same data by the first and second processors, when the storage control circuit receives a request for data from the first cache, and that data has been modified by the second processor and is stored in modified form in the second cache, the storage control circuit causes the second cache to transfer the modified data to the first cache without returning the data to the shared lower level storage.

In the specific embodiment described below, the shared lower level storage system includes a lower level or level 2 cache, as compared to the first and second caches which are level 1 caches. The level 2 cache maintains copies of data in main storage and further maintaining an indication of those level 1 caches having copies of data and whether those copies have been modified. When a request for data from a level 1 cache is received by the storage control circuit, this request is delivered to the level 2 cache, which determines whether another level 1 cache is storing a modified copy of the data, and if so the level 2 cache returns to the storage control circuit a pointer to the level 1 cache having the modified copy of the data.

The level 2 cache maintains data in a queue from least to most recently used. When a request for data from a level 1 cache is satisfied by returning a pointer to another level 1 cache, the level 2 queue is updated to identify the copy of that data in the level 2 cache as most recently used.

Each level 1 cache maintains an indication of whether data in the level 1 cache is shared or modified. If an attempt is made to write to data which is shared, a request for ownership is delivered to the level 2 cache prior to writing to the data. The level 2 cache maintains an indication of whether data in the level 2 cache is shared, exclusive or modified. If data in the level 2 cache is identified as shared when a request for ownership of that data is made by a level 1 cache, the level 2 cache requests ownership of the data from a system bus prior to granting ownership to the level 1 cache. In addition, as part of granting ownership to data to a level 1 cache, and as part of delivering data to a level 1 cache in response to a read with intent to modify, the level 2 cache instructs all level 1 caches with copies of that data to flush the data. The level 2 cache also marks data as modified whenever ownership has been granted to a level 1 cache or the data has been delivered to a level 1 cache in response to a read with intent to modify.

When the level 2 cache removes data due to aging, or due to loss of ownership to another processor complex, the level 2 cache instructs any level 1 cache having an unmodified copy of the data to flush the data from the level 1 cache, or instructs a level 1 cache having a modified copy of the data to write the modified data back to main storage as well as flush the data from the level 1 cache. When the level 2 cache receives a request from another processor complex to read data, the level 2 cache instructs any level 1 cache having a modified copy of the data to write the data back to main storage and to the level 2 cache, and marks the data as shared.

These and other features and advantages, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

Figure 1:
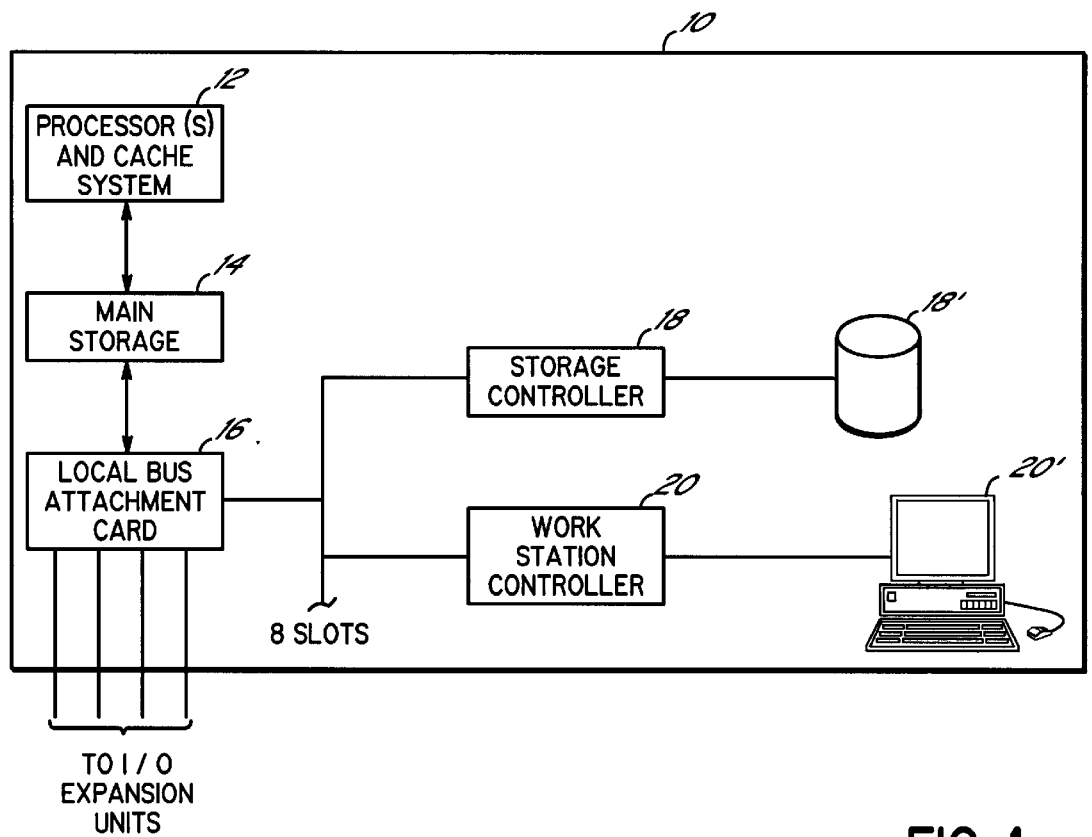
FIG. 1 is a block diagram of a system processing unit including processor(s) and cache system, main memory, and peripheral devices, implementing principles of the present invention in accessing a main memory.

As seen in FIG. 1, a typical computer system utilizing principles of the present invention comprises a system processing unit 10 including one or more system processors and cache systems 12, a main storage unit 14, a local bus attachment card 16 including modules for connecting fiber optic cables leading to input/output expansion units, a storage controller 18, with storage device 18', and work station controller 20, with work station 20'.

Figure 2:
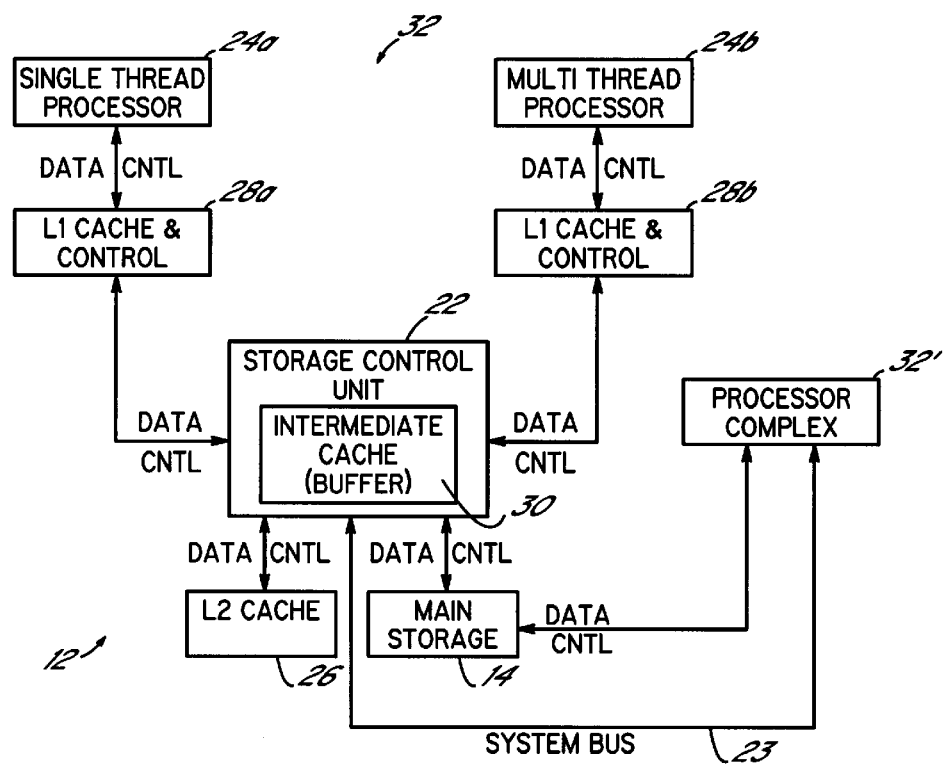
FIG. 2 is a block diagram of a plurality of single- and multi-threaded processors used in conjunction with a cache system in accordance with principles of the present invention.

FIG. 2 illustrates a processor and cache system 12 in accordance with principles of the present invention. In accordance with principles of the present invention as described in more detail below, within a first processor complex 32, a storage control unit 22 manages data utilized by the processors in a manner to enhance memory performance.

Each processor 24 of the computer system, interacts with an L1 cache and control circuit 28 to obtain and store needed data. Each L1 cache 28 stores a relatively few, e.g., 512 or 1024, cache lines. Each cache line stores a copy of a group of sequential memory locations in main storage 14, e.g., 128 sequential memory locations. Every address in main storage 14 is uniquely associated with a line in L1 cache 28; the associated line in L1 cache 28 for a particular address can be determined from a subset of the bits of the address. Through the same association, each cache line in L1 cache 28 is associated with several groups of sequential addresses that might be stored in that cache line. At any time, a cache line in L1 cache 28 can store a copy of sequential memory locations for a small number, e.g., two of the address ranges associated with that cache line.

Each L1 cache 28 incorporates a directory identifying which sequential memory locations are being stored in that L1 cache 28. Specifically, the L1 cache directory stores an indication of the ranges of addresses of the memory locations in main storage 14 for which copies currently reside in, i.e., are resident in, a line of L1 cache 28. As noted above, multiple different groups of sequential memory locations in main storage 14 may map to the same line in L1 cache 28; accordingly, the L1 cache directory identifies which of the multiple different groups of memory locations in main storage 14 are resident in L1 cache 28.

The L1 caches 28 interact with storage control unit 22 to obtain data and instructions to execute a computer program. When the processors 24a and 24b respectively access a memory location via respective L1 cache and control circuits 28a and 28b, if the L1 cache and control circuit is not storing the requested data, then the access request is delivered to storage control unit 22. Using circuitry and functionality described below, storage control unit 22 responds by obtaining the requested data, and delivering the data to the requesting L1 cache and control 28a or 28b.

Storage control unit 22, implementing principles of the present invention, controls the input and output of data from/to processors 24a and 24b and L1 caches 28a and 28b, using various storage units, including caches, buffers and main memory.

Storage control unit 22 further manages the delivery and input of instructions to processors 24a and 24b.

As shown in FIG. 2, storage control unit 22 interfaces with main storage 14. Main storage 14 typically comprises a bank of relatively high-volume, moderate speed memory such as one or more DRAM chips. Main storage 14 implements a paging memory management scheme; specifically, the moderate speed memory stores pages of memory locations which have been swapped out of a bank of mass storage (see 18', FIG. 1), facilitating more rapid access to these memory locations.

Each storage location in main storage 14 is associated with an address, which uniquely identifies that memory location among all of the memory locations in main storage 14. To access a memory location, an address is delivered to main storage 14, and in response main storage 14 delivers the contents of the identified memory location. As part of such an access, a description of the access, including the address and the type of access, is supplied to a system bus 23. Consequently, as other processor complexes make access to main memory 14, storage control unit 22 may monitor system bus 23 to identify the type of access and take appropriate action as described below.

To provide high speed access to frequently used memory locations, storage control unit 22 further interfaces with a level 2 or L2 cache 26. L2 cache 26 is similar to L1 cache 28. Each line in L2 cache 26 is associated with a number of groups of sequential memory addresses, a number of which may be stored in the associated L2 cache line at one time. Further, L2 cache 26 is associated with an L2 cache directory. Each entry in the L2 cache directory identifies ranges of addresses of the memory locations stored in L2 cache 26. To identify whether a desired address is resident in L2 cache 26, selected bits from the address are used to select a uniquely associated one of the entries in the L2 cache directory, and then the address ranges stored in the selected L2 cache directory entry are compared to the desired address.

Most accesses are subject to buffering within storage control unit 22 before delivery to an L1 cache 28. Specifically, storage control unit 22 includes a cache buffer 30, also known as an intermediate or transition cache, for managing the delivery of data from/to an L1 cache 28, to/from L2 cache 26 and/or main storage 14. Cache buffer 30 includes a small number, e.g., eight lines of data storage, each line capable of storing the same quantity of data as a line in an L1 cache 28 and L2 cache 26. The eight lines in cache buffer 30 are used to buffer lines stored in a L1 cache 28 and L2 cache 26 or corresponding groups of memory locations in main storage 14, as data is transferred between the caches 28, 26 and main storage 14.

Each line in cache buffer 30 stores data identifying the current use and status of the cache buffer line; specifically, whether the line is in use, and if so the kind of access for which the line is being used, the status of servicing the access and the address of the access, as well as other information. Whenever there has been a miss in an L1 cache 28, and data must be obtained from the L2 cache 26 or main storage 14, a line in cache buffer 30 is assigned to the miss, so that when the data is returned from the L2 cache 26 or main memory, the data is stored in the assigned line of cache buffer 30, and then transferred from this line to an L1 cache 28 and/or L2 cache 26. Similarly, whenever the retrieval of a line into an Li cache 28 or L2 cache 26 or other conditions require a castback from a line to L2 cache 26 or to main storage 14, a line of cache buffer 30 is assigned to the castback, so that the data is cast back from an L1 cache 28 or L2 cache 26 into the assigned line of cache buffer 30, and then transferred from this line to L2 cache 26 or main storage 14.

The assignment of cache lines to particular accesses and castbacks, and the process of obtaining data for accesses and castbacks into the cache buffer 30 and delivering the data out of the cache buffer 30, is managed by logic in storage control unit 22 using the data stored therein. It will be appreciated that additional processor complexes such as 32', having their own processors and cache systems (not shown in FIG. 2) may be connected to main storage 14 and system bus 23 for loading and storing data.

Figure 3:
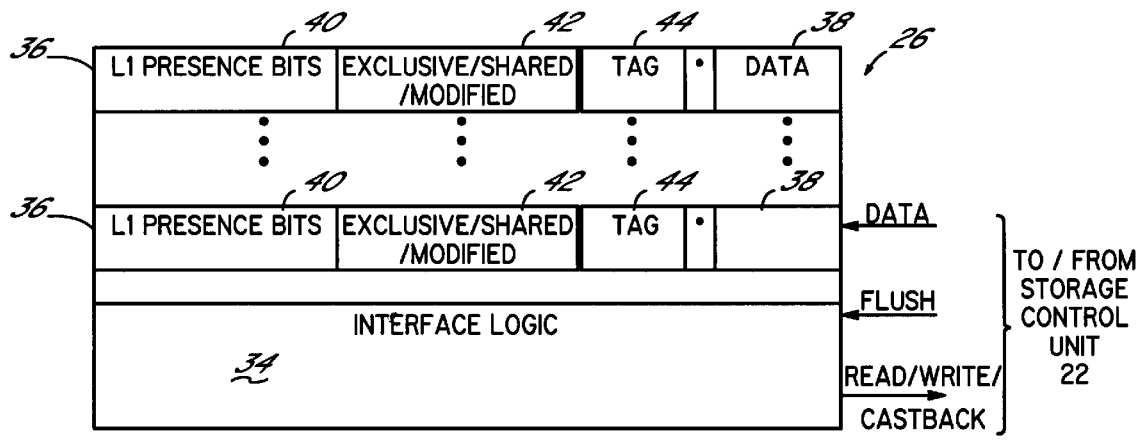
FIG. 3 is a block diagram of the contents of the L2 cache illustrated in FIG. 2.

Referring now to FIG. 3, details of the L2 cache 26 can be explained. L2 cache 26 comprises interface logic circuitry 34 for communicating with storage control unit 22, and a plurality of cache lines 36 each for storing cached data. Lines 36 comprise a number of control fields and a field 38 for storing the cached data. The control fields necessary for carrying out principles of the present invention, include a L1 presence bits field 40 for identifying the L1 caches having copies of the data managed by the cache line, a state field 42 for identifying the state of the line (exclusive, shared or modified), and a tag field 44 for identifying the address in main storage 14 to which the data in field 38 corresponds. L2 cache 26 is responsive to commands and data received from storage control unit 22 to save or retrieve data from lines 36, as will be explained in detail below. L2 cache 26 also manages replacement of lines 36 therein, by maintaining a queue of lines 36 to order those lines from least to most recently used.

Figure 4:
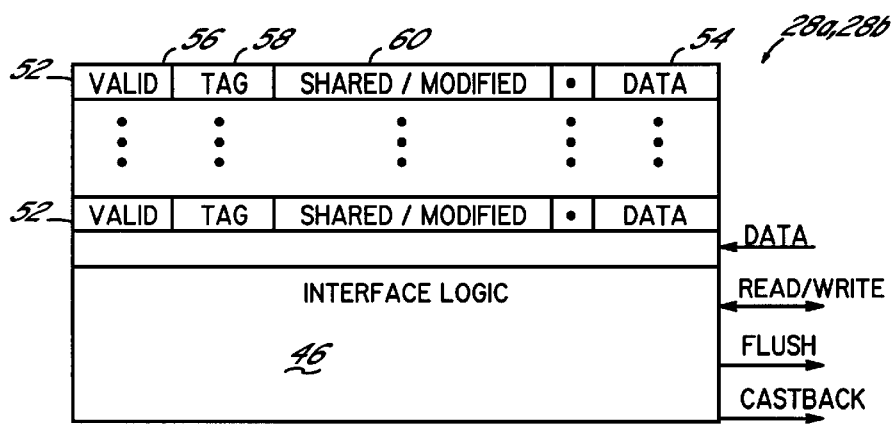
FIG. 4 is a block diagram of the contents of the L1 caches illustrated in FIG. 2.

Referring now to FIG. 4, details of the L1 caches can be explained. Each L1 cache 28 comprises interface logic circuitry 46 for communicating with storage control unit 22, and a plurality of cache lines 52 each for storing cached data. Lines 52 comprise a number of control fields and a field 54 for storing the cached data. The control fields necessary for carrying out principles of the present invention, include a valid field 56 for identifying whether the data in the cache line is valid, a tag field 58 for identifying the address in main storage 14 to which the data in field 54 corresponds, and a state field 60 for identifying the state of the line (shared or modified) of the data in the cache line 52. The L1 cache 28 is responsive to commands and data received from storage control unit 22 to save or retrieve data from lines 52, as will be explained in detail below. L1 cache 28 also manages replacement of lines 52 therein, by maintaining a queue of lines 52 to order those lines from least to most recently used.

Figure 5A:
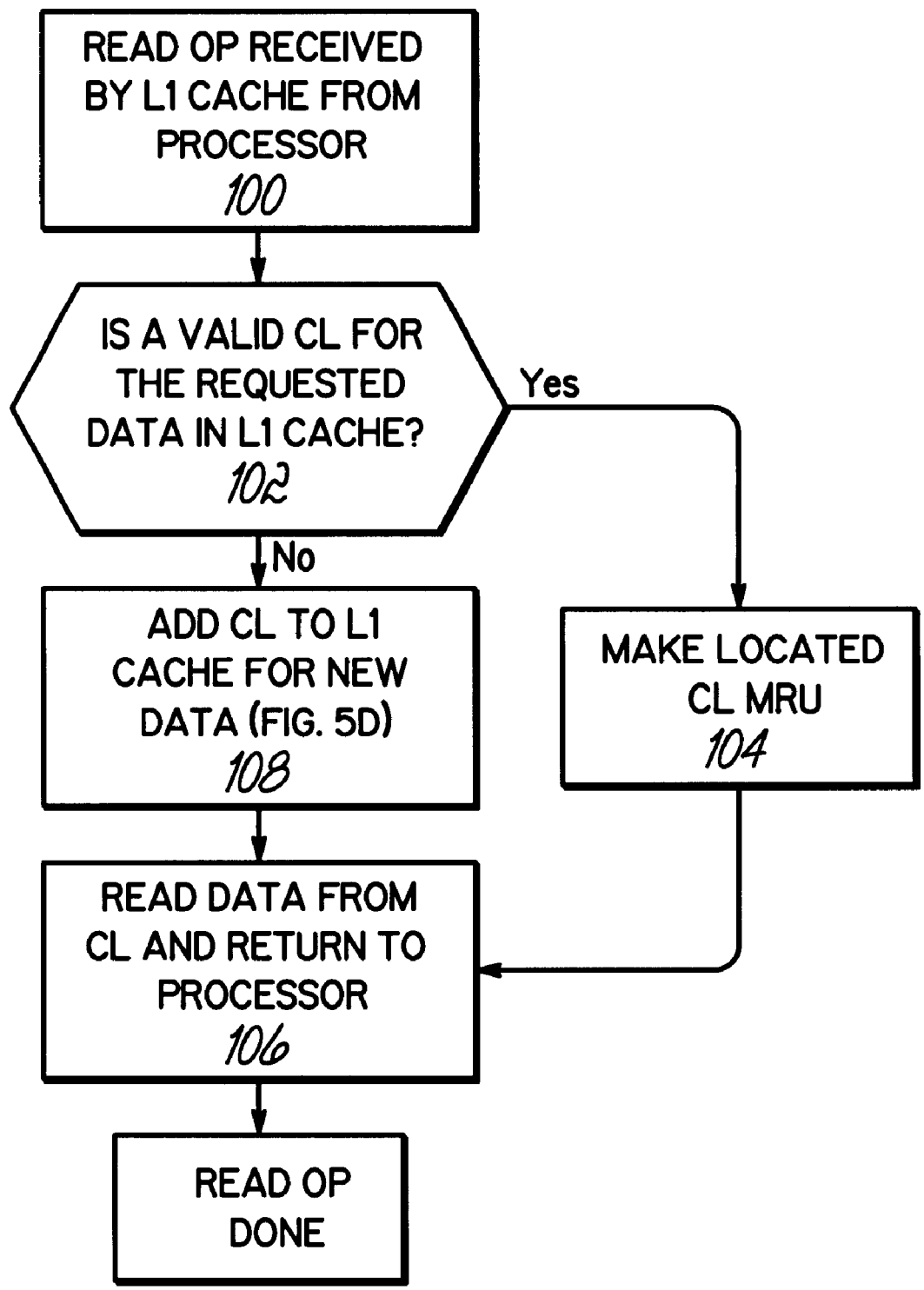
FIG. 5A is a flow chart of operations performed by the L1 caches illustrated in FIG. 2 in response to receipt of a read operation from the associated processor.

Referring now to FIG. 5A, operations performed by the L1 caches in response to receipt of a read operation from the associated processor may be explained. In response to the read operation (step 100), the L1 cache determines whether the cache has a valid CL for the requested data (step 102). If so, then in step 104 the located CL is moved to the most-recently-used position in the cache, and in step 106 the desired data is read from the located CL and returned to the processor. If, however, there is not a valid CL for the requested data, then in step 108, which is detailed further below in connection with FIG. 5D, a cache line is added to the L1 cache containing the requested data, and then in step 106 the desired data is read from the located CL and returned to the processor.

Figure 5B:
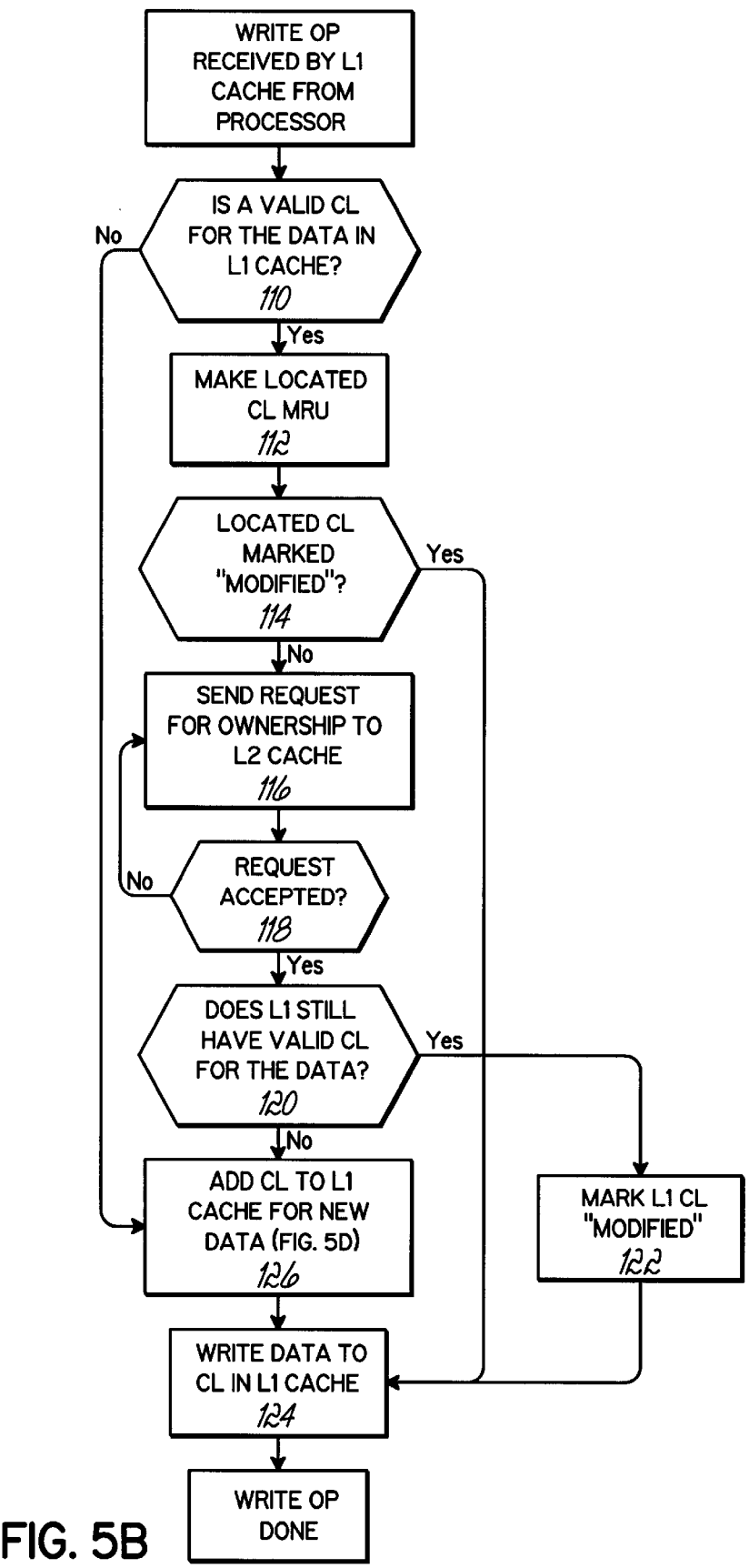
FIG. 5B is a flow chart of operations performed by the L1 caches illustrated in FIG. 2 in response to receipt of a write operation from the associated processor.

Referring now to FIG. 5B, operations performed by the L1 caches in response to receipt of a write operation from the associated processor can be explained. As a first step 110, the L1 cache determines whether there is a CL in the cache for the requested data. If so, then processing continues to step 112, in which the located CL is made the most recently used. Then in step 114, the located CL is evaluated to determine whether the CL is marked "modified".

As noted above, each CL in the L1 cache may have a state of "shared" or "modified". The "shared" state indicates that the data in the L1 cache has not been modified since it was read into the cache from the L2 cache or main memory, and that there may be one or more other caches that are storing similar unmodified copies of the data. The "modified" state indicates that the data in the L1 cache has been modified since it was read into the cache from the L2 cache or main memory. As will be seen, an L1 cache can place a CL in the "modified" state if the L1 cache has requested and received exclusive ownership of that data; therefore, when a CL is in the "modified" state this further indicates that there are no other caches storing copies of the data.

Accordingly, if in step 114 it is determined that the located CL is not marked "modified", then it can be determined that the data in the located CL is unmodified and there may be another cache having a copy of the data. Accordingly, prior to writing to the located CL, in step 116 a request for ownership is sent to the L2 cache 26. As will be seen below, this request will be either accepted or denied by the L2 cache. In step 118 it is determined whether the request for ownership was accepted, and if not, the request is retried in step 116. This loop of steps 118 and 116 repeats until the request for ownership is accepted. At that point, in step 120 the L1 cache determines whether the located CL continues to have valid data for the request. This step is performed due to the possibility that processing of other requests in the L1 cache (as described below) can occur while the loop of steps 1 16 and 118 is being repeated in an attempt to obtain ownership.

If in step 120 the located L1 CL continues to have valid data for the request, then in step 122 to the located L1 CL is marked "modified" to indicate the data in the CL has been changed, and then in step 124 the data being written by the processor is written into the L1 CL.

If in step 120 the locate L1 CL no longer has valid data for the request, or if in step 110 there is no valid CL having data for the request in the cache, then processing arrives at step 126, in which a CL is added to the L1 cache having the new data, as discussed below with reference to FIG. 5D. After this step, then in step 124 the data for the request is written to the newly added CL.

Figure 5C:
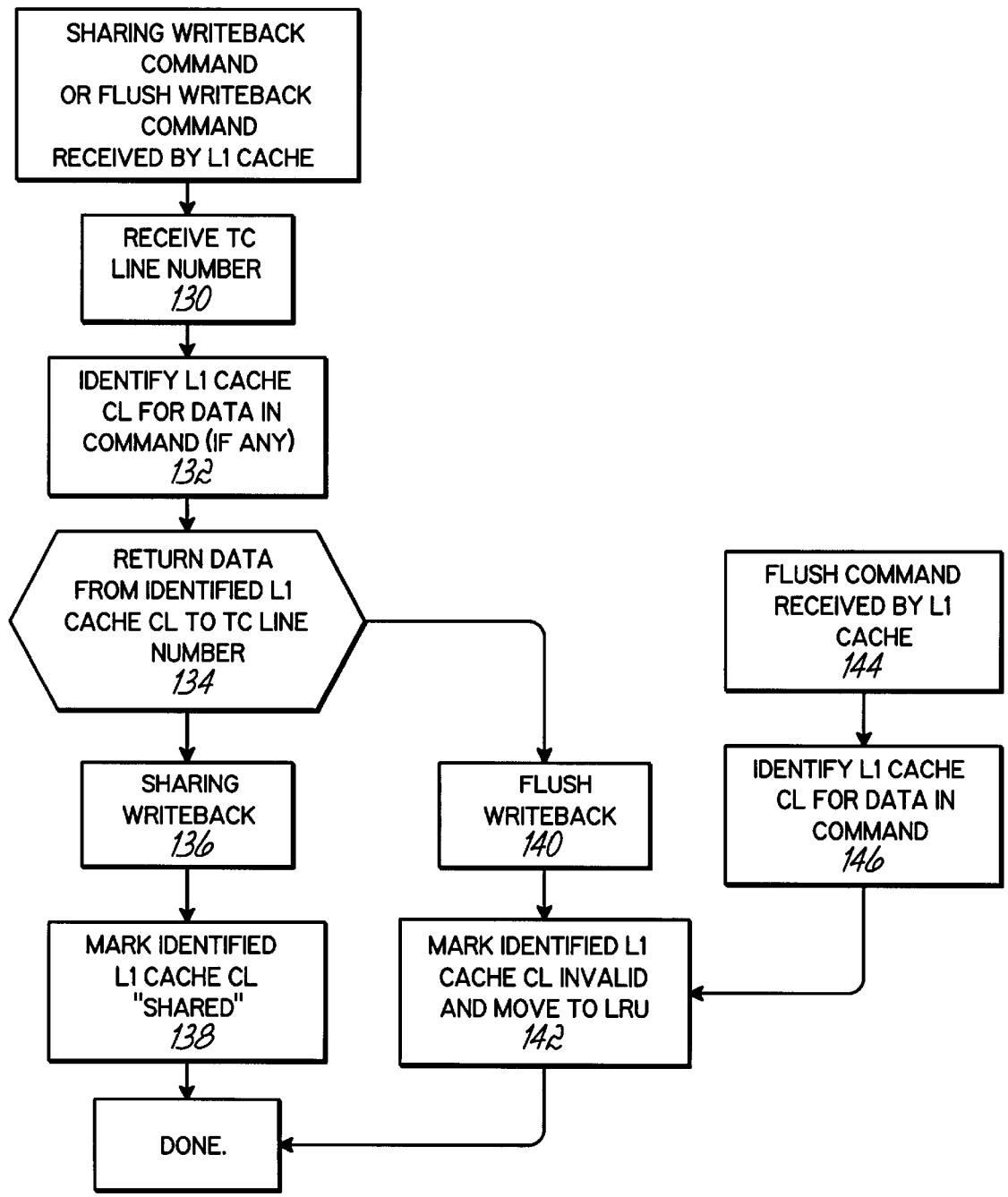
FIG. 5C is a flow chart of operations performed by the L1 caches illustrated in FIG. 2 in response to receipt of a sharing writeback, flush writeback or flush command received from a lower level storage unit.

Referring now to FIG. 5C, operations performed by the L1 caches in response to receipt of a sharing writeback, flush writeback or flush command can be explained.

As will be elaborated below, an L1 cache receives a sharing writeback command when the L2 cache in the same processor complex determines that another processor complex is attempting to read the data that is the subject of the sharing writeback command, and further determines that a modified version of the data is in the L1 cache. In response to a sharing writeback command the modified data in the L1 cache is written back to the L2 cache and to main memory, and the state of the modified data in the L1 cache is changed from "modified" to "shared".

As also elaborated below, an L1 cache receives a flush writeback command when the L2 cache from the same processor complex determines that another processor complex is attempting to read the data that is the subject of the flush writeback command, and further determines that a modified version of the data is in the L1 cache. A flush writeback command can also be generated when the L2 cache removes, due to aging, the cache line for the corresponding data in the L2 cache and there is a modified version of the data for the L2 cache line in the L1 cache. A flush writeback command can also be generated when the L2 cache instructs the transition cache to transfer modified data from one L1 cache to another L1 cache. In response to a flush writeback command the modified data in the L1 cache is written back to the transition cache, and the data is invalidated in the L1 cache. The transition cache then, as appropriate, transfers the data to the L2 cache and to main memory, or transfers the data to another L1 cache.

Finally, as seen below, an L1 cache receives a flush command when the L2 cache from the same processor complex determines that the data should be removed from the L1 cache, at a time when the data has not been modified in the L1 cache. This can occur when the L2 cache determines that another processor in the same processor complex, or another processor complex, is attempting to obtain ownership of the data, or when the L2 cache removes, due to aging, a cache line for the same data in the L2 cache. In response to a flush command the L1 cache invalidates the data in the L1 cache.

Accordingly, upon receipt by an L1 cache of either a flush or sharing writeback, data must be returned through the transition cache buffer to either the L2 cache or main memory, or both. Accordingly, in a first step 130 after receiving a flush or sharing writeback command, the L1 cache receives a transition cache line number to which the data should be written. Next in step 132 the L1 cache identifies the CL in the L1 cache containing the data identified in the flush or sharing writeback command. Normally, there will be a CL in the L1 cache for the identified data; however, in certain race conditions brought about by a simultaneous aging operation (see FIG. 5D), the CL for data may have been invalidated when a flush or sharing writeback for that data is received. (If there is no CL for the data identified by the flush or sharing writeback command, then the flush or sharing writeback command is aborted, since the aging operations would achieve the same ends as the flush writeback command.)

After identifying the CL for the flush or sharing writeback command, in step 134 the data in the CL is written to the transition cache buffer identified in step 130. At this point, different operations are taken for flush or sharing writeback commands.

If a sharing writeback command (step 136), in step 138 the identified CL is marked "shared" to indicate that another cache or processor complex will have a copy of the data, and processing of the sharing writeback command is done. If a flush writeback command (step 140), in step 142 the identified CL is marked invalid and moved to the least-recently-used (LRU) position in the queue maintained by the L1 cache, so that the CL will be reused quickly, and the processing of the command is done.

Operations in response to receipt of a flush command are relatively simple because it is not necessary to write data back to the transition cache buffer. Accordingly, in response to a flush command, the L1 cache identifies the CL in the L1 cache containing the data identified in the flush command. Under normal conditions there may or may not be a CL in the L1 cache for the identified data; if the optional no longer present castback is implemented (see FIGS. 5D and 6D and 7C), then under most circumstances the L2 cache will be informed when the L1 cache no longer has specific data, and will not send unnecessary flush commands to the L1 cache; however, even where the no longer present castback is implemented, in certain race conditions brought about by a simultaneous aging operation (see FIG. 5D), the CL for data may have been invalidated when a flush command is received. (If there is no CL for the data identified by the flush command, then the flush command is aborted, since the aging operation would achieve the same ends as the flush command.) After a CL for the data identified in the flush command is identified, in step 142 the identified CL is marked invalid and moved to the least-recently-used (LRU) position in the queue maintained by the L1 cache, so that the CL will be reused quickly, and the processing of the command is done.

Figure 5D:
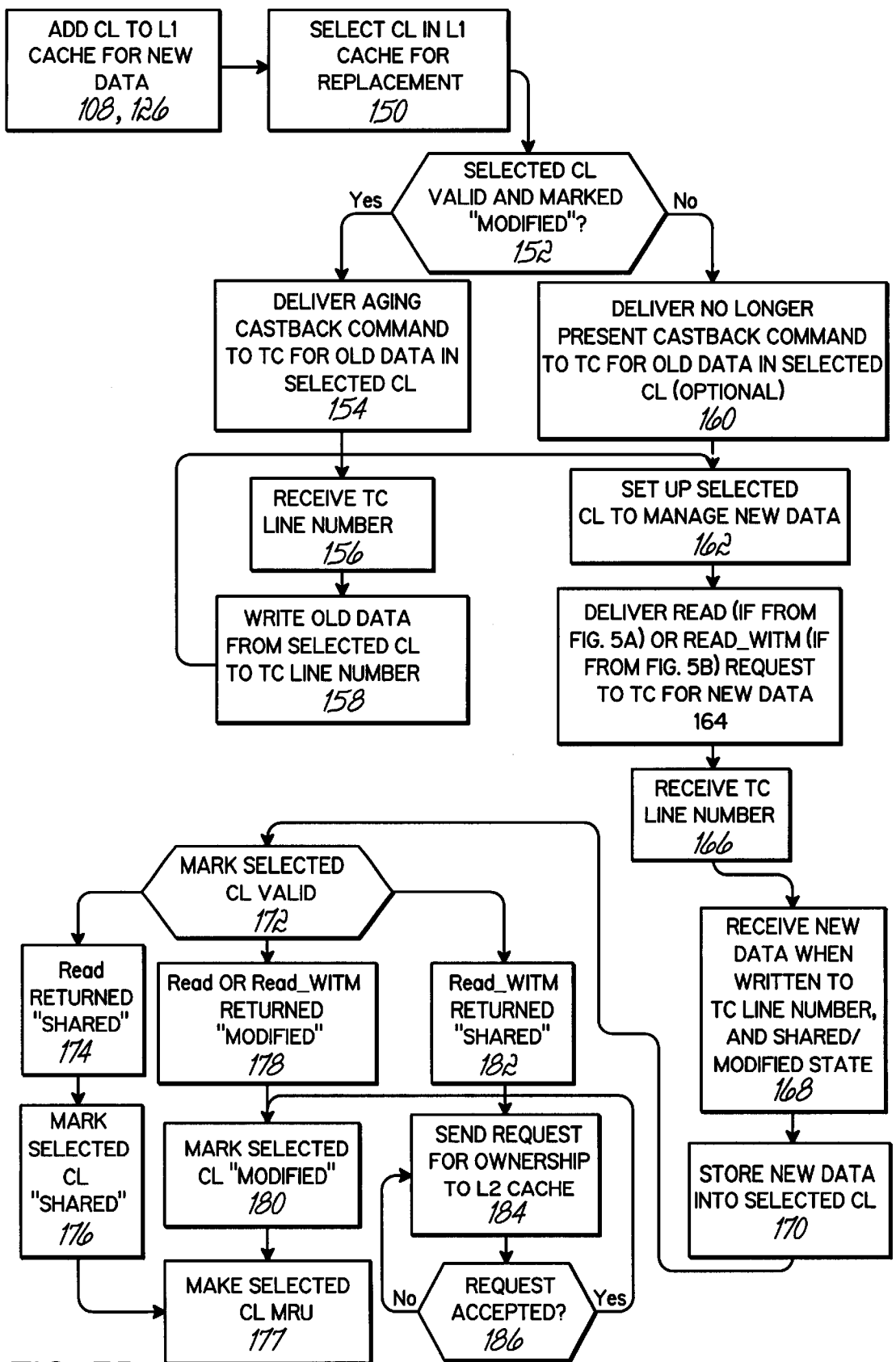
FIG. 5D is a flow chart of operations performed by the L1 caches illustrated in FIG. 2 as part of adding a cache line (CL) to the L1 cache to store new data.

Referring now to FIG. 5D, the operations performed by the L1 caches as part of adding a cache line (CL) can be explained. It will be noted from the foregoing that a CL may need to be added to an L1 cache as a consequence of responding to a request to read data (step 108) or as a consequence of responding to a request to write data (step 126). In either situation, the data is obtained from the L2 cache or from main memory. Where the data is being obtained to satisfy a request to write data (step 126), then the data is obtained by way of a read_with_intent_to_modify operation, as will be detailed below.

To begin adding a CL to the L1 cache, in step 150 a CL in the L1 cache is selected for replacement. This may involve determining which CL in the L1 cache is least recently used, or may involve additional more complex operations involving statistics on use of the L1 CL's. In any event, once a CL is selected for replacement, in step 152 the selected CL is evaluated to determine whether it is marked valid and modified. If so, then the data in the selected CL has been modified and must be written back to the L2 cache and/or main memory. Accordingly, in this situation in step 154 an aging castback command is delivered to the transition cache buffer for the old data in the CL that was selected for replacement. The transition cache responds by assigning a transition cache buffer line number to the aging castback and returning the line number to the L1 cache, which is received in step 156. Then, in step 158, the old data from the CL selected for replacement, is written to the identified line number in the L1 cache.

If in step 152 it is determined that the selected CL is invalid, or is valid but does not contain modified data, then it is not necessary to write the data from the selected CL back into the L2 cache or main memory. If the selected CL is invalid, no other steps need be taken to prepare the CL to store new data. However, if the CL is valid but the data is not modified, then an optional step 160 may be performed to notify the L2 cache that the L1 cache is no longer storing a copy of the data. This is done by delivering a no longer present castback command to the transition cache identifying the old data in the CL selected for replacement. As will be seen in more detail below, this step is optional but if performed streamlines later processing by allowing the L2 cache to avoid unnecessary flush commands.

After step 158 or the optional step 160, in step 162 steps are taken to set up the CL to store the new data. Specifically, the tag in the CL is set to properly identify the address of the new data, and any other fields or administrative changes are made to associate the CL with the new data.

Next, to obtain the data, in step 164 a read or read_with_intent_to_modify request is delivered to the transition cache to obtain the new data for the CL. In response, the transition cache buffer will assign a line number to the request and return this line number to the L1 cache, where it is received in step 166. In step 168, the new data is received by the L1 cache as it is written to the transition cache line number that was identified in step 166. At the same time, the state of this data, shared or modified, is received. As will be seen below, when data is delivered to the transition cache from the L2 cache, main memory or another Li cache, it is delivered along with a state indicating whether the data is modified, i.e., is not the same as the data in the main memory, or alternatively is shared, i.e., is the same as that stored in main memory, in which case there may be other copies of the data in other caches.

In step 170, the newly received data is stored in the selected CL. Then in step 172 the selected CL is marked valid so that it may be used to satisfy the pending request. Finally, steps are taken based on the type of request that initiated the retrieval of the data, to appropriately set the CL in the shared or modified state. Specifically, if the new data was retrieved to satisfy a read request from the processor connected to the L1 cache (step 174), and the data was returned marked shared, then in step 176 the selected CL is marked shared, and in step 177 the selected CL is made the most recently used CL in the L1 cache, and the process of adding the CL is done. Alternatively, if the new data was returned marked "modified" (step 178), then regardless of the type of access that initiated the retrieval of the data, in step 180 the CL is marked "modified" and, in step 177, made the most recently used CL in the L1 cache, and processing is done. Finally, if the new data was retrieved to satisfy a write request from the processor connected to the L1 cache (step 182), and the data was returned marked "shared", then actions must be taken to obtain ownership of the data. Specifically, in this situation in step 184 a request for ownership is sent to the L2 cache. In step 186, if this request is denied, then processing returns to step 184 and the request is made again. Ultimately, the request for ownership will be accepted, and processing will proceed from step 186 to step 180 in which the selected CL will be marked "modified" to reflect that the data in the CL will be written by the processor, and then in step 177 the selected CL is made the most recently used CL in the L1 cache, and processing is done.

Figure 6A:
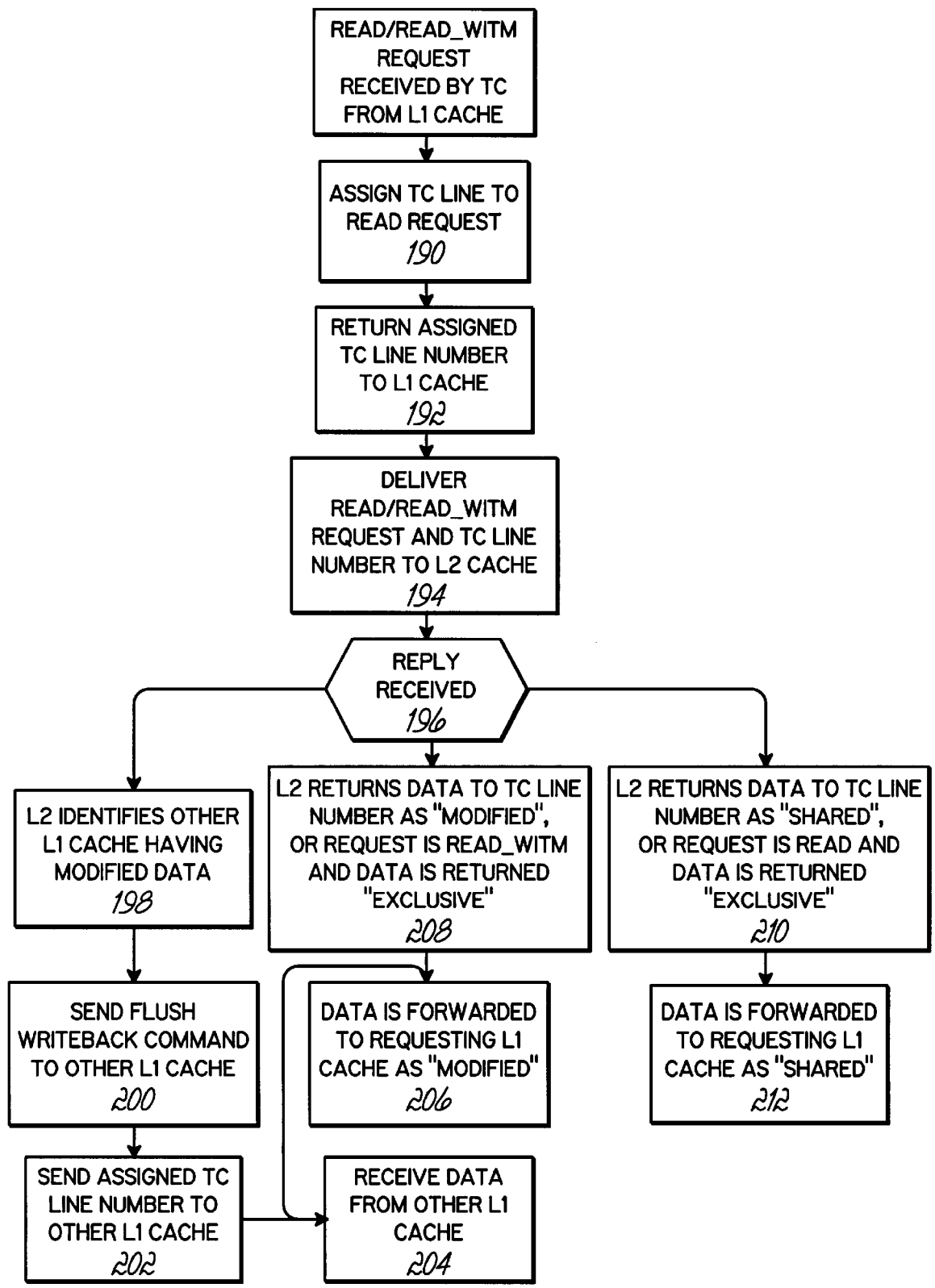
FIG. 6A is a flow chart of operations performed by the transition cache (cache buffer) in the storage control unit illustrated in FIG. 2 as part of responding to a read or read_with_intent_to_modify request received from an L1 cache.

Referring now to FIG. 6A, the operations preformed by the transition cache buffer as part of responding to a read or read_with_intent_to_modify request received from an L1 cache can be explained. As noted above, as an initial response to either type of request, in step 190 a transition cache line is assigned to the request, and in step 192 this cache line is returned to the L1 cache. Then, in step 194, a read or read_with_intent_to_modify request, as appropriate, is delivered to the L2 cache along with the line number that was assigned in step 192. The L2 cache will then respond in step 196, in one of three ways.

First, the L2 cache may respond by identifying another L1 cache that has a modified version of the data sought by the read or read_with_intent_to_modify request (step 198). If this occurs, then in step 200 a flush writeback command is sent to the other L1 cache, to cause the other L1 cache to flush this data back to the transition cache buffer so that it can be moved to the requesting L1 cache. Then, in step 202, the transition cache buffer line number assigned in step 192 is delivered to the other L1 cache so that the other L1 cache will return the modified data to the same transition cache buffer line being monitored by the requesting L1 cache. In step 204, the data in the other L1 cache is returned to the assigned transition cache line, and in step 206 the data is forwarded to the requesting L1 cache as it is written to the transition cache line. In one implementation, the requesting L1 cache may monitor writes to the transition cache and receive the data directly as it is written from the other L1 cache to the transition cache, so that the data is obtained by the requesting L1 cache as quickly as possible. As the data is returned, it is marked "modified" to signify that the data is not the same as the data in the L2 cache and/or in the main memory. The requesting L1 cache will then take the appropriate action with the data, as described above.

It will be noted that this functionality provides a substantial savings in time, since the data can be directly transferred from one L1 cache to another L1 cache without being written back to the L2 cache or to the main memory. Particularly where there are two processors repeatedly overwriting the same data, this feature of the present invention, by allowing the modified data to be directly transferred between the L1 caches, provides a substantial savings in cache overhead.

If (step 208) the data being sought by the requesting L1 cache is in the L2 cache and has been modified, but is not present in another L1 cache (because the modified data has been flushed and aged out of the L1 caches), then the L2 cache will respond by returning the data to the transition cache as marked "modified". Similarly, if the L1 cache is reading the data with intent to modify, and the data is in the L2 cache marked "exclusive", then the L2 cache will respond by returning the data to the transition cache marked as "exclusive". In either case, then in step 206 the data is again forwarded to the requesting L1 cache marked "modified", as it is written to the transition cache line. Specifically, the requesting L1 cache may monitor writes to the transition cache and receive the data directly as it is written from the L2 cache to the transition cache, so that the data is obtained by the requesting Li cache as quickly as possible. The requesting L1 cache will then take the appropriate action with the data, as described above.

If the data sought by the requesting L1 cache is in the L2 cache and has not been modified, or if the data is not in the L2 cache and must be brought into the L2 cache from main memory, then in step 210 the L2 cache will return the data to the transition cache buffer marked as either "shared" or "exclusive". If the data is returned marked "shared", in step 212 the data is returned to the L1 cache marked "shared". If the data is returned marked "exclusive", and the L1 cache is reading the data without intent to modify, then in step 212 the data is returned to the L1 cache marked "shared". The L1 cache will then respond appropriately, and may produce a request for ownership as discussed above.

Figure 6B:
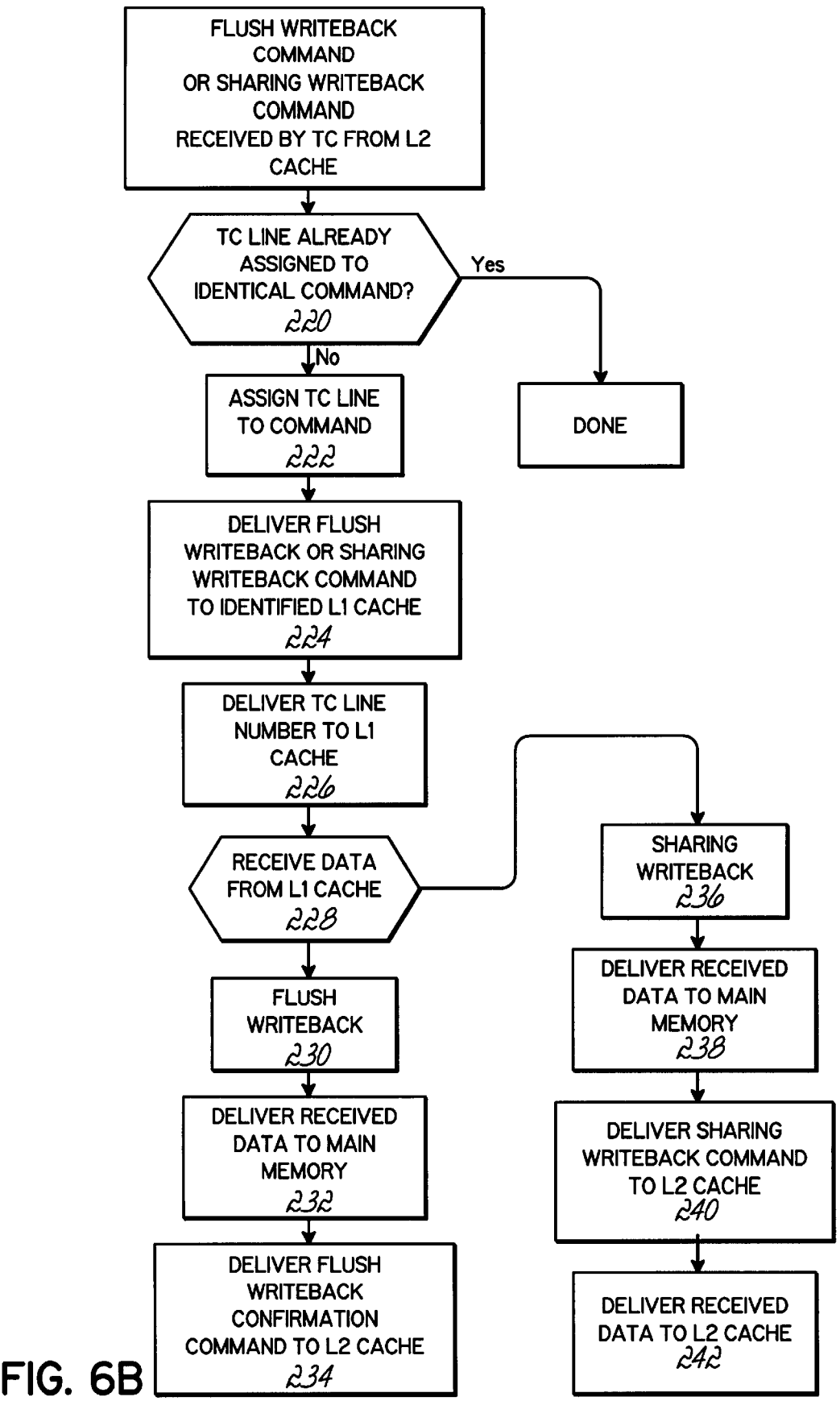
FIG. 6B is a flow chart of operations performed by the transition cache (cache buffer) in the storage control unit illustrated in FIG. 2 as part of responding to a flush writeback or sharing writeback command received from the L2 cache.

Referring now to FIG. 6B, operations performed by the transition cache as part of responding to a flush writeback or sharing writeback command received from the L2 cache, can be understood. As noted above and detailed below, these commands are received by the transition cache when the L2 cache determines that the data in an L1 cache must be flushed due to aging of the corresponding L2 cache line or due to a request for access and/or ownership of that data by another processor complex.

In the latter situation, as will be noted below, while the L2 cache is waiting for completion of the requested writeback, the L2 cache will block/deny the read or request for ownership of the other processor complex. The other processor complex will then issue a retry of the read or request for ownership.

If a transition cache line has not already been assigned, then in step 222, a line is assigned. Then in step 224 a flush writeback or sharing writeback command is delivered to the L1 cache having the modified data, and in step 226 the transition cache line assigned in step 224 is delivered to the L1 cache. Thereafter, in step 228 the Li cache responds by delivering the data to the identified line.

At this point, different processing is performed based on the type of writeback command issued by the L2 cache. If the command was a flush writeback (step 230), then in step 232 the data received from the L1 cache is delivered directly to main memory, and in step 234 a flush writeback confirmation is delivered to the L2 cache. The data is not stored in the L2 cache since the L2 cache has already determined that the data should be flushed from the entire processor complex. If the command was a sharing writeback (step 236), then in step 238 the data is delivered to the main memory, and in addition, in step 240 a sharing writeback command is delivered to the L2 cache and in step 242 the data is also delivered to the L2 cache and stored in the L2 cache.

Figure 6C:
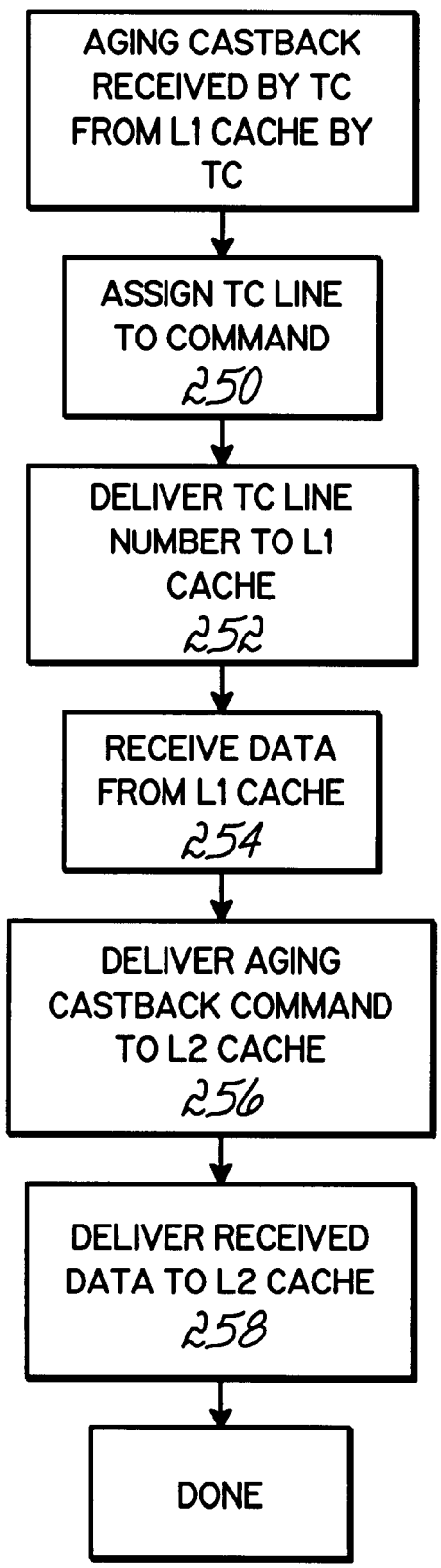
FIG. 6C is a flow chart of operations performed by the transition cache (cache buffer) in the storage control unit illustrated in FIG. 2 as part of responding to an aging castback from an L1 cache.

Referring now to FIG. 6C, operations performed by the transition cache in responding to an aging castback from an L1 cache can be explained. As explained above, an aging castback occurs when modified data is aged from an L1 cache. Since there is no indication that another processor complex is in need of the modified data, the transition cache delivers it only to the L2 cache. Accordingly, in a first step 250, a transition cache line is assigned to the command, and in step 252 this line number is delivered to the L1 cache. In step 254, the data is received from the L1 cache. Then, in step 256, an aging castback command is delivered to the L2 cache, and in step 258 the received data is delivered to the L2 cache.

Figure 6D:
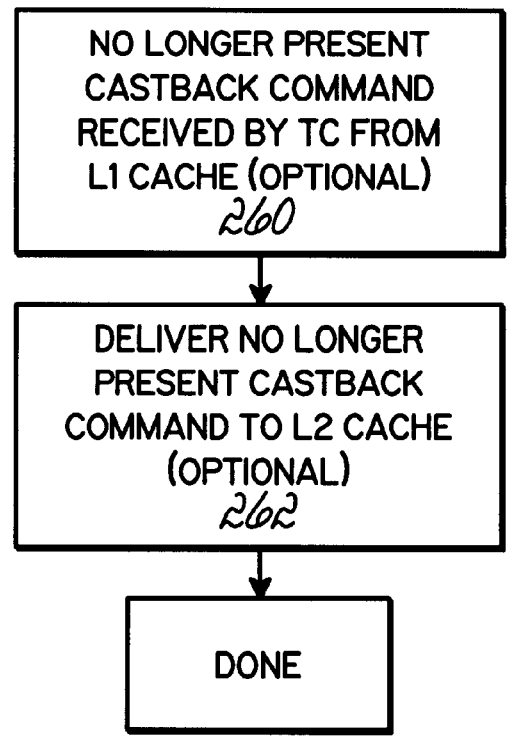
FIG. 6D is a flow chart of optional operations that may be performed by the transition cache (cache buffer) in the storage control unit illustrated in FIG. 2 as part of responding to a no longer present castback from an L1 cache.

Referring now to FIG. 6D, optional operations that may be performed by the transition cache as part of responding to a no longer present castback from an L1 cache, can be explained. As noted above, a no longer present castback notifies the L2 cache that the L1 cache originating the castback no longer has a copy of identified data. The data itself has not been changed and so is not returned from the L1 cache. Accordingly, after the no longer present castback is received (step 260), in step 262 a no longer present castback for the same data is delivered to the L2 cache.

Figure 7A:
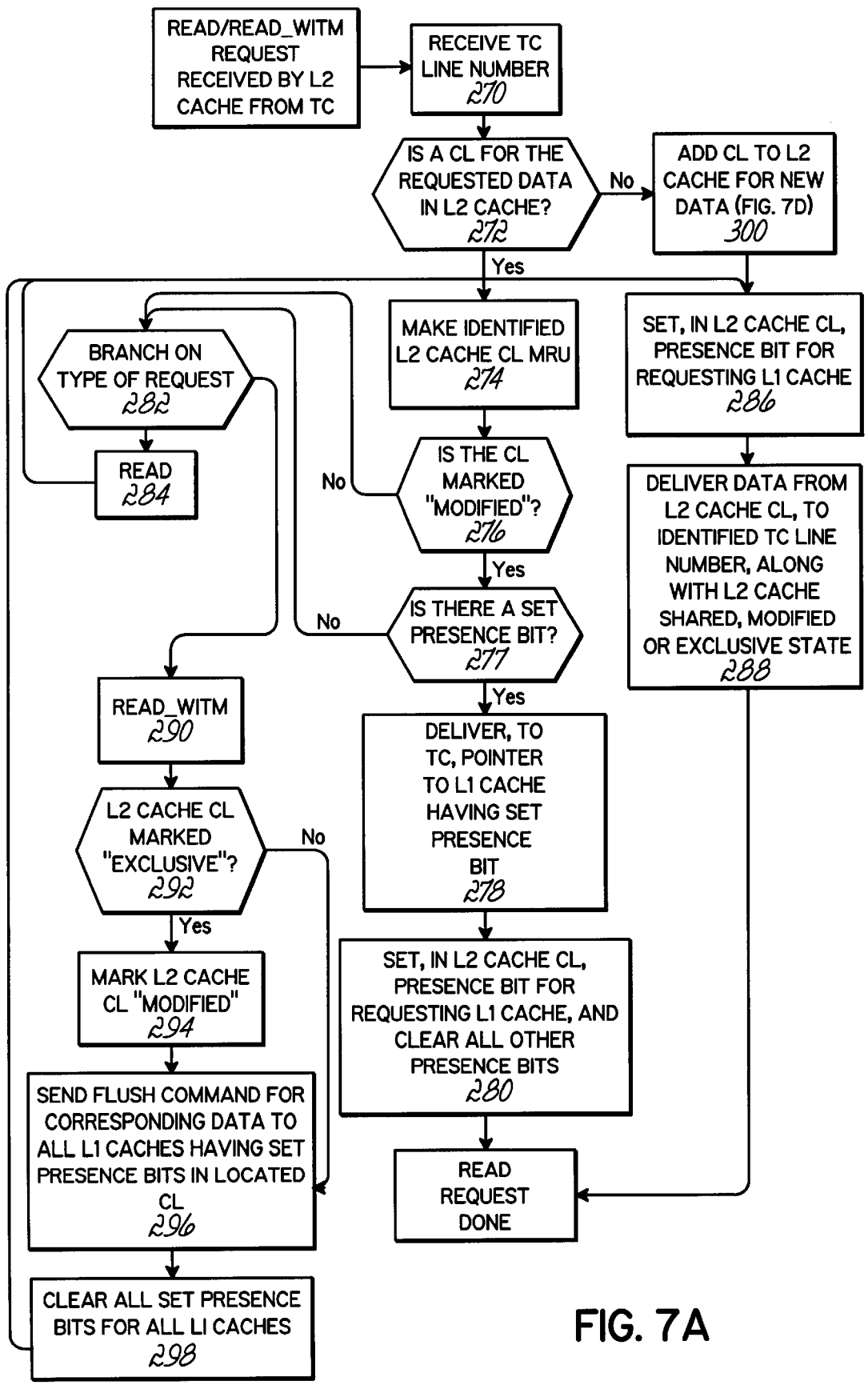
FIG. 7A is a flow chart of operations performed by the L2 cache illustrated in FIG. 2 as part of responding to a read or read_with_intent_to_modify request from the transition cache (cache buffer)

Referring now to FIG. 7A, operations performed by the L2 cache as part of responding to a read or read_with_intent_to_modify request from the transition cache can be explained. As a first step 270, the transition cache line number for the operation is received from the transition cache. Then, in step 272 the L2 cache determines whether the requested data is in the L2 cache by searching for a valid CL for the requested data. If there is a CL for the data in the L2 cache, then in step 274 the identified CL is made the most recently used. Next, in step 276 the CL is inspected to determine whether it is marked "modified". If so, then in step 277 the L2 cache determines whether there is an Li cache having the modified data, by determining whether there is a set presence bit in the identified CL.

If there is a set presence bit in step 277, then the situation discussed above has occurred, where an L1 cache has modified data that is needed by another L1 cache. In this situation, in step 278, a pointer to the L1 cache having the set presence bit is delivered to the transition cache, causing the transition cache to transfer the modified data from the L1 cache currently having the data to the L1 cache needing the data. As noted above, this direct L1 to peer L1 data transfer, can substantially reduce the overhead involved in managing cached data, particularly where two processors are repeatedly overwriting the same data. After step 278, in step 280 the presence bit for the L1 cache currently having the modified data is cleared, and the presence bit for the L1 cache that is requesting the data is set, to reflect that the modified data is now in the requesting L1 cache. Thereafter, the processing of the request is done.

If in step 276, the located CL is not marked "modified", or if in step 277 none of the presence bits in the CL are set, then the requested data is returned from the L2 cache CL. In this case, different actions are taken (step 282) based on the kind of read request received from the transition cache. If the request is a read (step 284), then in step 286, the presence bit for the requesting L1 cache is set, and then in step 288 the data in the L2 cache CL is delivered to the transition cache line that was identified in step 270, along with the modified, shared or exclusive state of the L2 cache CL. If the request is a read_with_intent_to modify (step 290), then in step 292 to the L2 cache CL inspected to determine whether it is in the "exclusive" state; if so, then in step 294 the CL is changed to the "modified" state since no other processor complexes have a copy of the data. If in step 292 the CL is not in the "exclusive" state, or after the CL is set to the "modified" state in step 294, in step 296 a flush command for the corresponding data is sent to any L1 caches having set presence bits in the located L2 CL; this is done to eliminate any copies of the data in other L1 caches so that the data can be owned by the requesting CL. Then, in step 298, all set presence bits for L1 caches are cleared to indicate that the L1 caches have been flushed. Processing then proceeds to steps 286 and 288 to set the presence bit for the requesting L1 cache and return the data from the L2 cache CL to the transition cache along with the shared, modified or exclusive state of the L2 cache CL.

If in step 272, there is no CL for the requested data in the L2 cache, then processing proceeds to step 300 in which a CL is added to the L2 cache for the new data, as described below with reference to FIG. 7D. Thereafter, processing proceeds to steps 286 and 288 to set the presence bit in the added CL for the requesting L1 cache and return the data from the added L2 cache CL to the transition cache along with the shared, modified or exclusive state of the added L2 cache CL.

Figure 7B:
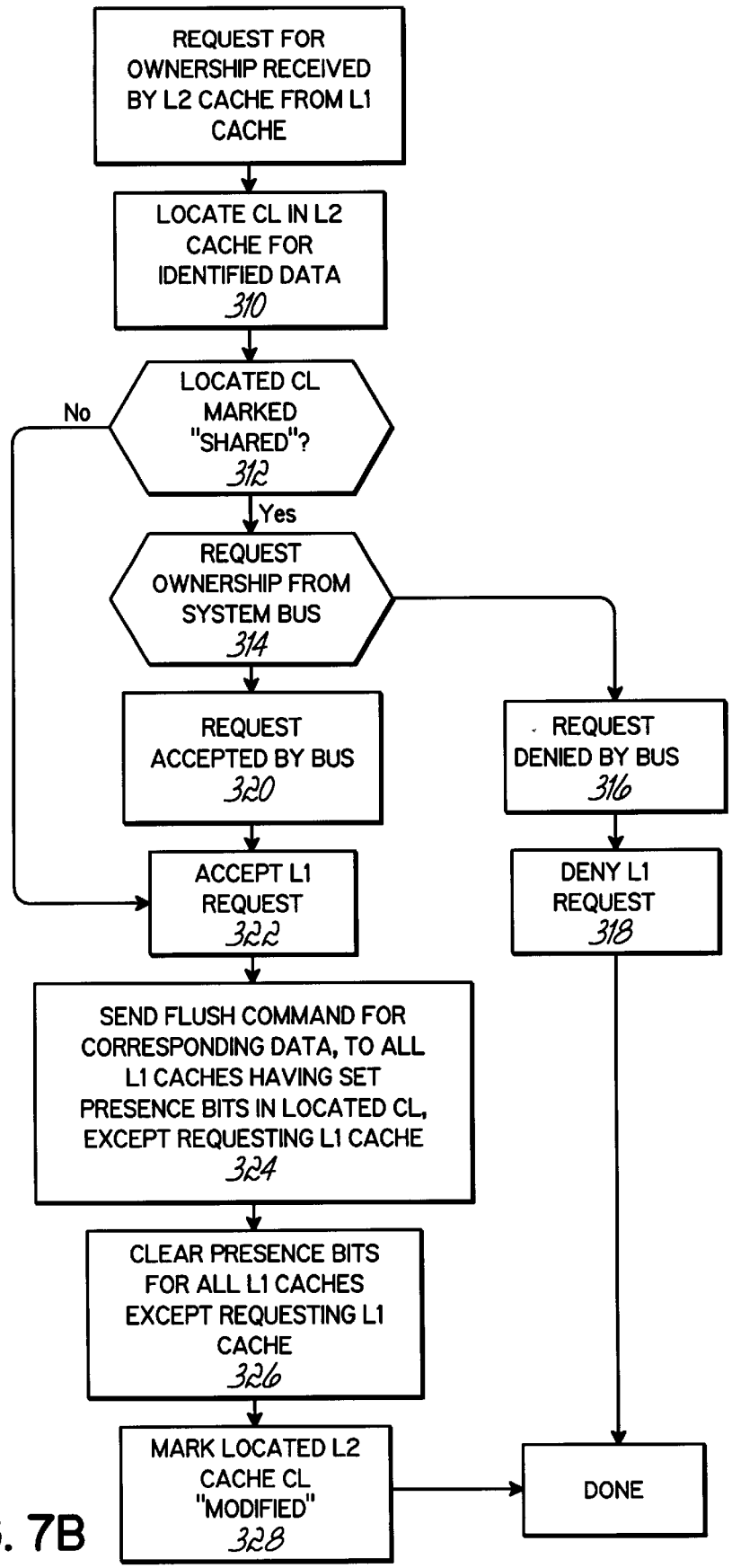
FIG. 7B is a flow chart of operations performed by the L2 cache illustrated in FIG. 2 as part of responding to a request for ownership received from an L1 cache.

Referring now to FIG. 7B, operations performed by the L2 cache as part of responding to a request for ownership received from an L1 cache, can be explained. As noted above, a request for ownership is issued by an L1 cache when the L1 cache receives a write request and has the corresponding data marked "shared" in the L1 cache. To respond to a request for ownership, the L2 cache must ensure that no other L1 cache has a copy of the data, and ensure that no other processor complex has a copy of the data, and mark the data "modified" in the L2 cache.

Accordingly, in responding to a request for ownership, in a first step 310 the L2 cache locates a CL in the L2 cache for the data identified in the request for ownership. It will be appreciated that all data that is in any L1 cache is also in the L2 cache, so at the time a request for ownership is received by the L2 cache, there should be a CL for the data in the L2 cache.

After identifying an L2 cache CL, in step 312 the located CL is evaluated to determine whether it is marked "shared". If the L2 cache CL is marked "shared", then there is another processor complex having a copy of the same data. Accordingly, if the L2 cache CL is marked "shared", then in step 314 the L2 cache delivers a request for ownership to the system bus, to attempt to cause other processor complexes to relinquish their copies of the data. This request may be accepted or denied. If the request is denied (step 316), for example because another processor complex has a modified copy of the data, then in step 318 the L2 cache will deny the request for ownership from the L1 cache, and processing of the request for ownership is done. It will be appreciated from the foregoing description of the actions of the L1 cache, that when a request for ownership by an L1 cache is denied, the L1 cache will retry the request until it is accepted. Accordingly, after a request for ownership is denied, the L2 cache will soon thereafter receive a repeat request, and the processing of FIG. 7B will begin again. It will also be appreciated from the following discussion, that when another processor complex denies a request for ownership, it begins the process of writing back to main memory the modified data, in order to accept the request for ownership when it is retried.

Accordingly, ultimately the request for ownership delivered to the system bus is accepted (step 320), in which case in step 322 the request from the L1 cache for ownership is accepted. Furthermore, if in step 312 the L2 CL is not marked shared, processing proceeds directly to step 322 and the request for ownership from the L1 cache is immediately accepted. After accepting the request for ownership, in step 324 a flush command is sent to all L1 caches having set presence bits in the L2 CL, excepting the L1 cache requesting ownership. This step ensures that no other L1 caches have a copy of the data. Then in step 326, the presence bits for all L1 caches are cleared, with the exception of the L1 cache requesting ownership. Finally, in step 328, the located L2 cache CL is marked "modified" to indicate that the data associated with the CL is modified in the L1 cache that requested ownership.

Figure 7C:
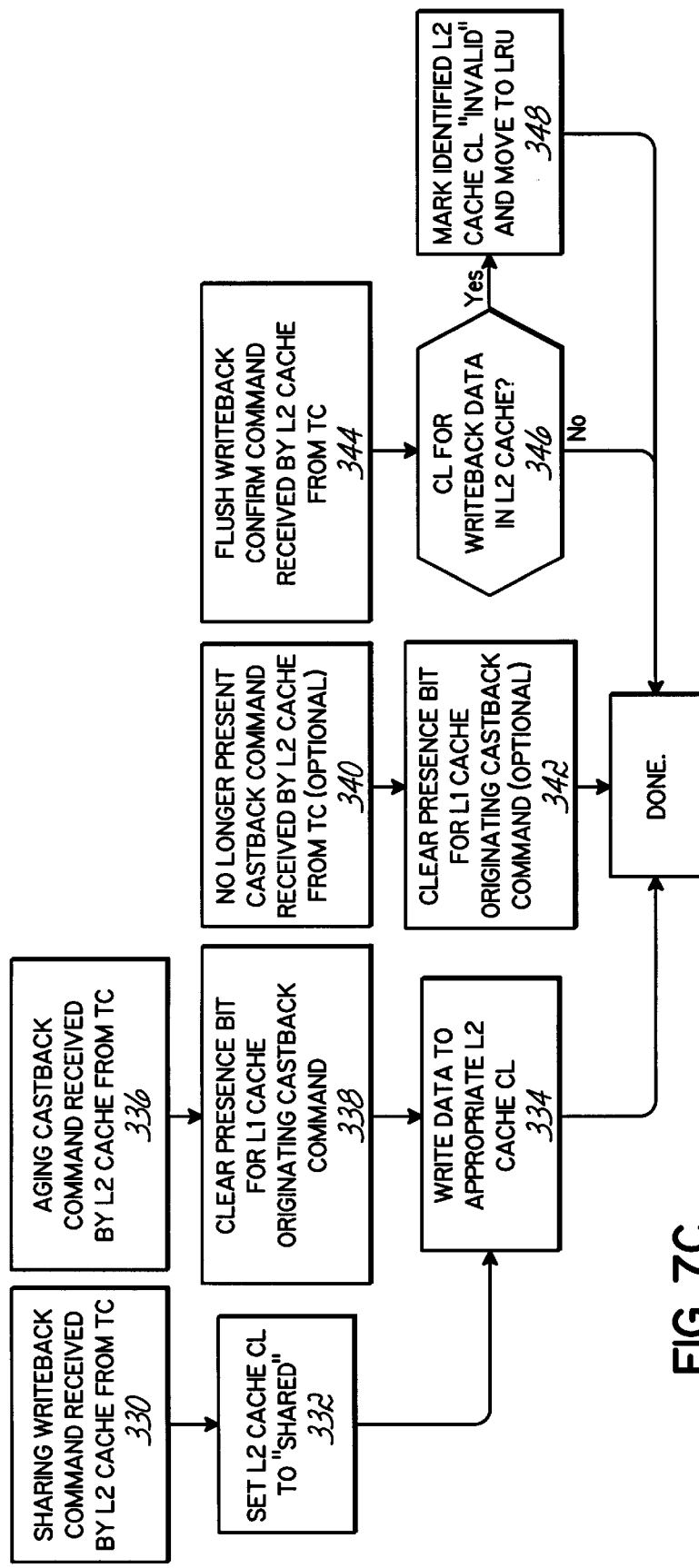
FIG. 7C is a flow chart of operations performed by the L2 cache illustrated in FIG. 2 as part of responding to sharing writeback, aging castback, optional no longer present castback, and flush writeback commands received from the transition cache (cache buffer)

Referring now to FIG. 7C, operations performed by the L2 cache as part of responding to sharing writeback, aging castback, optional no longer present castback, and flush writeback commands can be explained. A sharing writeback command (step 330) is received by the L2 cache when an L1 cache has written modified data back to the main memory and to the L2 cache as a result of another processor complex attempting to read the data. Accordingly, when a sharing writeback command is received, in step 332 the corresponding L2 cache CL is identified and it is set to "shared" to reflect that another processor complex will be retrieving a copy of the data. Then, in step 334, the modified data for the sharing writeback is received by the L2 cache from the transition cache and stored in the identified L2 cache CL.

An aging castback (step 336) is received by the L2 cache when an L1 cache having modified data ages out that data and returns it to the L2 cache. Accordingly, when an aging writeback command is received, in step 338 the corresponding L2 cache CL is identified and the presence bit in the CL for the L1 cache originating the castback command is cleared, to reflect that the data for the command is no longer in the L1 cache. Then in step 334 the modified data for the aging castback is written into the identified L2 cache CL.

An optional no longer present castback command (step 340) is received by the L2 cache when an L1 cache ages out unmodified data. Accordingly, when a no longer present castback command is received, in step 342 the corresponding L2 cache CL is Page 24 of 36 identified and the presence bit in the Cl for the L1 cache originating the command is cleared, to reflect that the data for the command is no longer in the L1 cache.

A flush writeback confirm command (step 344) is received by the L2 cache when L1 cache having modified data has returned that data to the main memory. This may occur when another processor complex attempting a write to that data, or when the L2 cache has aged the associated CL from the L2 cache. Accordingly, when a flush writeback confirm command is received, the L2 cache may or may not have a CL for the associated data. Accordingly, in a first step 346, it is determined whether there is a CL in the L2 cache for the associated data. If not, then no further processing is required. If, however, there is a CL in the L2 cache for the data identified by the flush writeback confirmation, then in step 348 this CL is marked "invalid" and moved to the least recently used position in the queue of CL entries maintained by the L2 cache.

Figure 7D:
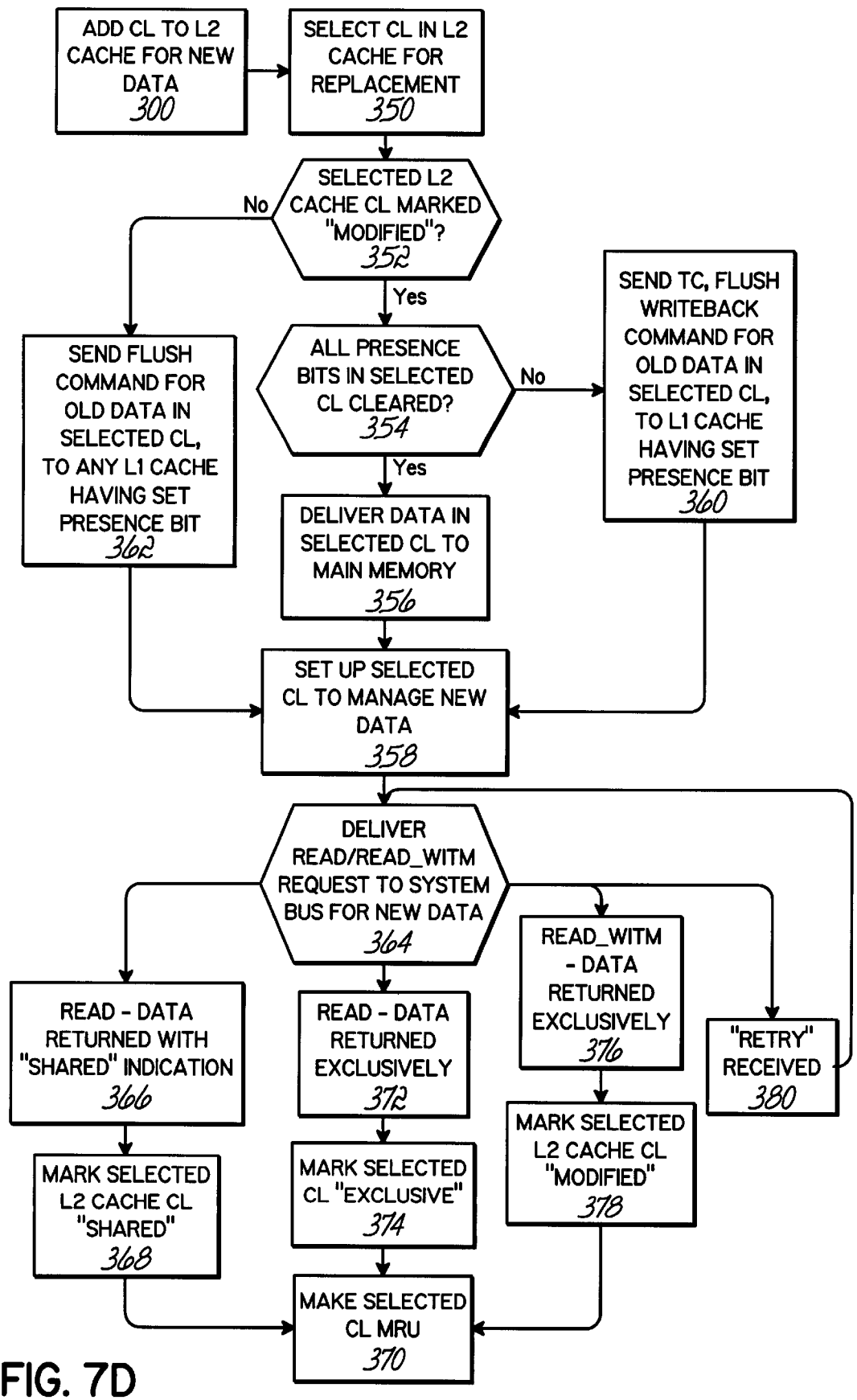
FIG. 7D is a flow chart of operations performed by the L2 cache illustrated in FIG. 2 as part of adding a cache line (CL) to the L2 cache for new data.

Referring now to FIG. 7D, operations performed by the L2 cache as part of adding a cache line (CL) to the L2 cache for new data, can be explained. As a first step 350, a CL in the L2 cache is selected for replacement. This may involve selecting a least recently used CL, or some more complex operations. Then in step 352, the selected CL is evaluated to determine whether it is marked "modified". If so, then special processing must be performed to move the modified data back to main memory. Accordingly, in step 354, the selected CL is evaluated to determine if any presence bits in the CL are set. If not, then the modified data is in the L2 cache CL and in step 356 the data is delivered from the L2 cache CL to the main memory, and in step 358 the CL is set up to manage the new data, including setting the tag of the CL to identify the address of the new data.

If in step 354, the selected CL has a set presence bit, then the L1 cache CL identified by the set presence bit is storing the modified data. In this case, in step 360 the L2 cache CL sends to the L1 cache have a set presence bit, a flush writeback command, to cause the L1 cache to flush the modified data and return it to main memory. The flush writeback command is sent via the transition cache so that the transition cache will manage the return of the data, as described above. Then processing proceeds to step 358 to set up the selected CL to receive the new data.

If in step 352, the selected CL is not marked "modified", then all copies of the data must be flushed from all L1 CL's. Accordingly, in this case in step 362 a flush command for the old data is sent to all L1 caches having set presence bits, thus causing those L1 caches to flush the data. Then processing proceeds to step 358 to set up the selected CL to receive the new data.

After step 358, the new data is obtained for storage in the selected CL. The first step is to deliver either a read or read_with_intent_to_modify request to the system bus for the new data. A read request is delivered if the L2 cache is setting up the new CL to respond to a read request from the transition cache, and read_WITM request is delivered if the L2 cache is setting up the new CL to respond to a read_WITM request from the transition cache.

After this request is delivered to the system bus, different actions are taken based on the respond from the system bus and main memory. If the data was requested in a read command and the data is returned marked "shared" (step 366), then in step 368 the selected L2 cache CL is marked "shared" to indicate that other processor complexes have a copy of the data, and then in step 370 the selected L2 cache CL is made most recently used, and the process for adding data to the L2 cache is done. Alternatively, if the data was requested in a read command and the data is returned marked "exclusive" (step 372), then in step 374 the selected L2 cache CL is marked "exclusive" to indicate that no other processor complexes have a copy of the data, and then in step 370 the selected L2 cache CL is made most recently used, and the process for adding data to the L2 cache is done.

If the data was requested in a read_WITM command and the data is returned marked "exclusive" (step 376), then in step 378 the selected L2 cache CL is marked "modified" to indicate that the data will be modified in this processor complex, and then in step 370 the selected L2 cache CL is made most recently used, and the process for adding data to the L2 cache is done. Alternatively, if a "retry" is received from the system bus in response to the read request (step 380), this indicates that another processor complex has a modified copy of the data and is in the process of returning this modified copy to the main memory. In this circumstance, the request must be retried, and so processing returns to step 364 to retry the request.

Figure 7E:
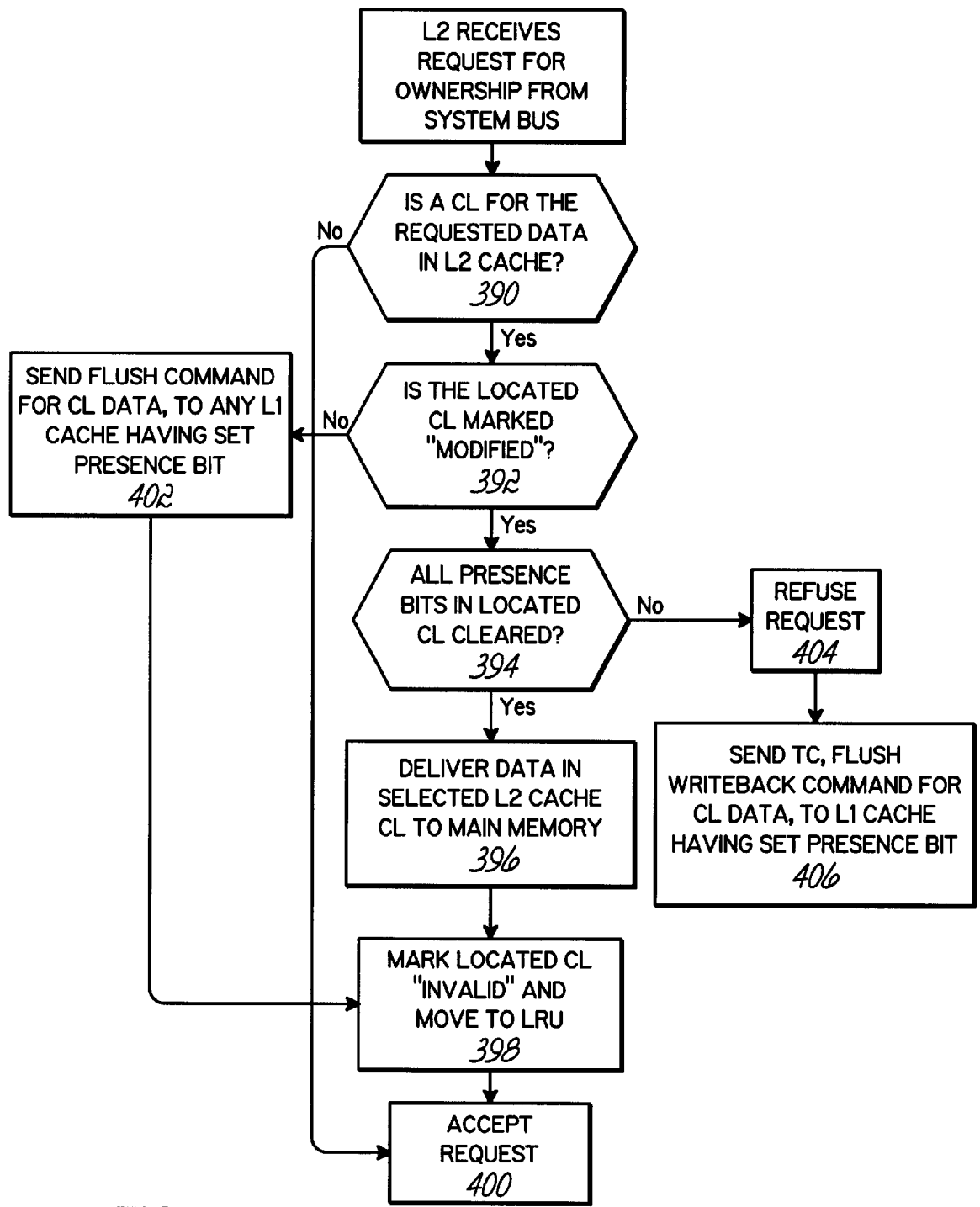
FIG. 7E is a flow chart of operations performed by the L2 cache illustrated in FIG. 2 as part of responding to a request for ownership received from another L2 cache over the system bus.

Referring now to FIG. 7E, operations performed by the L2 cache as part of responding to a request for ownership received from another processor complex, can be explained. As a first step 390, the L2 cache determines whether it has a CL for the requested data in the L2 cache. If so, then the CL must be evaluated to determine how to handle the request for ownership. In this situation, in step 392, the CL is inspected to determine whether it is marked "modified". If so, there is a modified copy of the data in this processor complex that has not been returned to main memory. The issue then becomes whether the modified data is in the L2 cache or must be flushed from one of the L1 caches. Therefore, in step 394, the presence bits in the L2 cache CL are inspected to determine if they are all cleared. If so, then the L2 cache has the most recent copy of the modified data, and in step 396 the data in the selected L2 cache CL is returned to main memory, and then in step 398 the selected L2 cache CL is marked "invalid" and moved to the least recently used position in the queue of CL's maintained by the L2 cache. At this point, the request for ownership can be accepted in step 400, and the other processor complex reads the modified data from the main memory.

If in step 390, the L2 cache determines that it does not have a CL for the identified data, then the L2 cache proceeds immediately to step 400 and accepts the request for ownership.

If in step 392, the L2 cache determines that it does have a CL for the data, but the data is not modified, then the data must simply be flushed from this processor complex, so in step 402 the L2 cache sends a flush command for the data, to all L1 caches having a set presence bit, and then the L2 cache proceeds to step 398 to mark the CL invalid and then to step 400 to accept the request for ownership.

If in step 394, the L2 cache determines that there is a set presence bit, then the modified data is in an L1 cache, and must be flushed. In this situation, in step 404 the request for ownership is refused to permit time for the L1 cache to flush the data to the main memory. Then in step 406, the L2 cache sends a flush writeback command to the L1 cache having the set presence bit, to cause that L1 cache to flush the data back to main memory. It will be appreciated that the other processor complex will repeat the request for ownership, and until a flush writeback confirmation is received indicating that the L1 cache has successfully returned the data to main memory, the L2 cache will have a CL entry for the data and will follow the same path and refuse the request for ownership. Once the L1 cache has successfully returned the data to main memory, the L2 cache will invalidate its CL entry (see FIG. 7C, above), and then the next request for ownership from the other processor complex will be accepted.

Figure 7F:
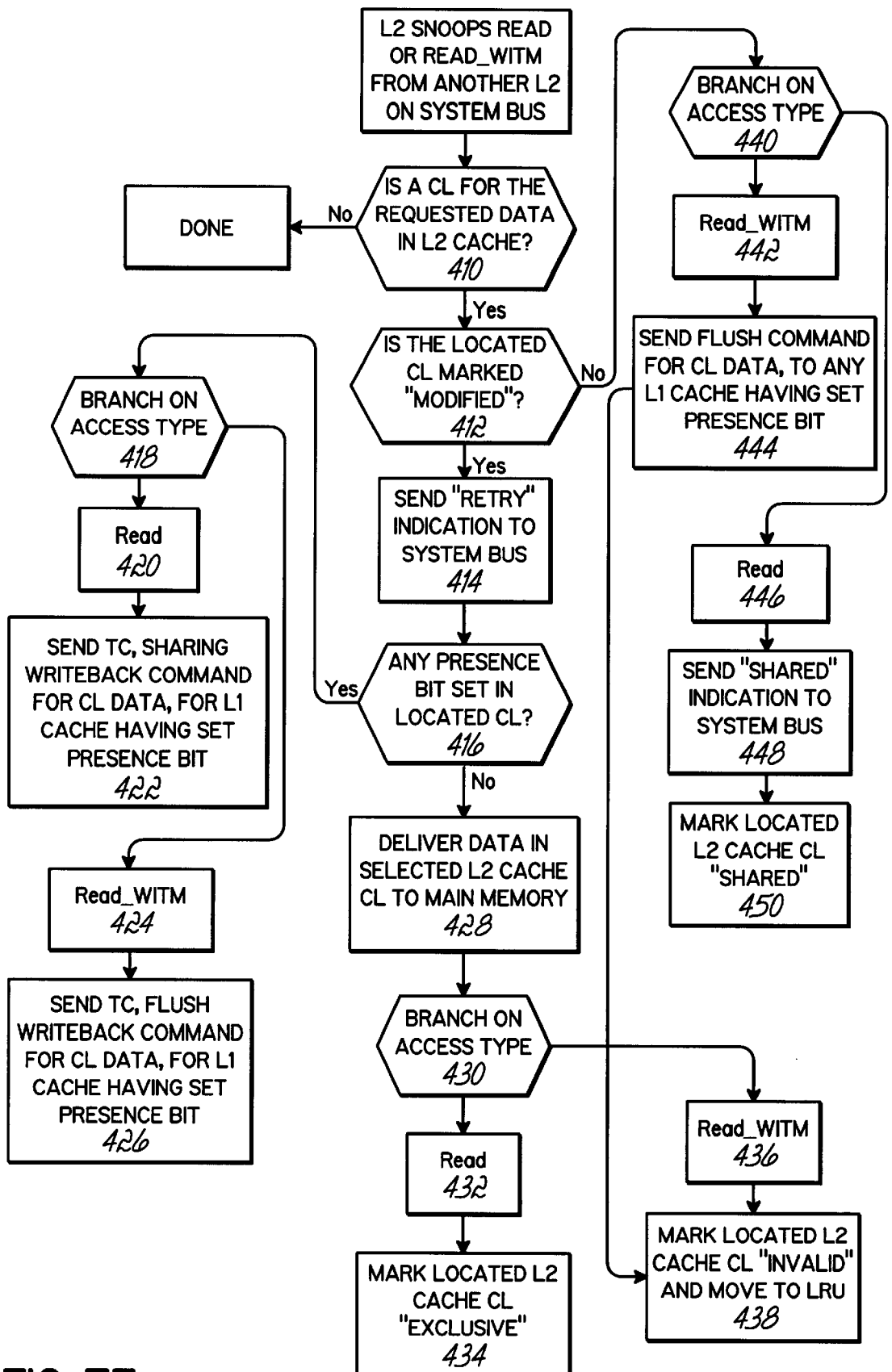
FIG. 7F is a flow chart of operations performed by the L2 cache illustrated in FIG. 2 as part of responding to a read or read_with_intent_to modify request from another L2 cache detected on the system bus.

Referring now to FIG. 7F, operations performed by the L2 cache when it snoops a read or read_with_intent_to_modify request from another processor complex, can be explained. When the L2 cache detects a read or read_WITM on the system bus, the L2 cache must determine whether it has a modified version of the data and must block the access with a "retry" command, and/or whether the L2 cache has an unmodified copy of the data and must cause the data to be returned to the other processor complex marked "shared". These determinations are performed in FIG. 7F.

As a first step 410, the L2 cache determines whether it has a CL for the requested data in the L2 cache. If not, no further action is needed. However, if there is a CL in the L2 cache for the requested data, then in step 412 the CL is evaluated to determine whether it is marked "modified". If so, then the request from the other processor complex must be blocked, and in step 414 a "retry" indication is sent to the system bus, permitting time for the data to be returned to the main memory.

Once the access from the other processor has been blocked due to the presence of modified data in this processor complex, in step 416, the L2 cache determines where the modified data is, by evaulating the presence bits in the CL to determine whether any are set. If so (step 418) different actions are taken based on the access type. If the access is a read access (step 420), then in step 422 a sharing writeback command for the data is sent to the L1 cache having a set presence bit, to cause the data in the L1 cache to be written back to the main memory and L2 cache and marked "shared". Until this occurs, any retry of the read request will be blocked with a "retry" through the same path described above. Once the L1 has written the data back to the main memory and to the L2 cache and the L2 cache CL has been marked "shared" (see FIG. 7C), then the access will be permitted, as noted below. Similarly, if the access from another processor complex is a read_WITM access (step 424), then in step 426 a flush writeback command for the data is sent to the L1 cache having a set presence bit, to cause the data in the L1 cache to be written back to the main memory and then cause the L2 cache CL to be invalidated. Until this occurs, any retry of the read request will be block through the same path as described above.

If in step 416, the L2 cache determines that there are no presence bits set, then the latest version of the modified data is in the L2 cache CL. In this case, in step 428 the modified data is delivered from the L2 cache CL to the main memory, to be available when the read request is retried. Then, based on the access type (step 430), different actions are taken. If the access was a read access (step 432), then the L2 cache CL is marked "exclusive" to indicate that the L2 cache data is not modified relative to the main memory, and for the time being the L2 cache has the only copy of the data. Subsequently, when the access is retried by the other processor complex, the L2 cache CL will be marked "shared", as explained below. If the access was a read_WITM access (step 436), then the data should be flushed from the L2 cache. Accordingly, in this situation in step 438 the L2 cache CL is marked "invalid" and made least recently used.

If in step 412, the L2 cache determines that the CL for the data that is subject to a read or read_WITM request is not marked "modified", then different actions are taken based on the type of the request (step 440). If the request is a read_WITM request (step 442), the data should be completely flushed from this processor complex. Accordingly, in step 444 a flush command for the CL data, is sent to any L1 cache having a set presence bit, and processing immediately proceeds to step 438 in which the L2 cache CL is marked "invalid" and made least recently used. If the request is a read request (step 446), then the access should be accepted but the data should be returned "shared", and the data in this processor complex should also be marked "shared" to reflect that another processor complex has a copy of the data.

Accordingly, in step 448 a "shared" indication is sent to the system bus so that the other processor complex will receive the data shared. Then, in step 450 the located L2 cache CL is marked "shared" to reflect that another processor complex has a copy of the data.

The foregoing description has been exemplary of the claimed invention. The invention in its broader aspects is therefore not limited to the specific details, representative apparatus and method, and illustrative example shown and described.

Accordingly, departures may be made from such details without departing from the spirit or scope of applicant's general inventive concept.

What is claimed is:

1. A memory-cache system for use in a multiprocessor environment in which memory accesses are generated by first and second processors, the system comprising:

a shared lower level storage system, which comprises a lower level cache and a main storage, the lower level cache maintaining copies of data in main storage, a first cache configured for connection to said lower level storage system and said first processor, receiving from said first processor memory access commands identifying data to be stored in said lower level storage system or data to be loaded from said lower level storage system, said first cache loading data from and storing data to said lower level storage system in response to said memory access commands, a second cache configured for connection to said lower level storage system and said second processor, receiving from said second processor memory access commands identifying data to be stored in said lower level storage system or data to be loaded from said lower level storage system, said second cache loading data from and storing data to said lower level storage system in response to said memory access commands, a cache storage control circuit, the storage control circuit managing loading of data from said lower level storage system to said caches and storing of data to said lower level storage system from said caches, wherein, said lower level storage system maintains an indication of whether the first or second caches are storing copies of data, and whether those copies have been modified, and upon receipt from said first cache of a request for data that has been modified by said second processor and is stored in modified form in said second cache, said storage control circuit causes said second cache to transfer said data to said first cache without returning said data to said shared lower level storage system, whereby the effect of repeated writes to the same data by the first and second processors is ameliorated.

2. The memory cache system of claim 1 wherein said storage control circuit, upon receiving a request for specified data from said first or second cache, delivers the request to the lower level cache, and said lower level cache responds to a request from said first or second cache for specified data by determining whether one of said first or second caches is storing a modified copy of said specified data, and if so, said lower level cache returns to said storage control circuit a pointer to the first or second cache having a modified copy of said specified data, and said storage control unit, upon receiving a pointer to said first cache in response to a request for specified data from said second cache, causes said first cache to deliver said specified data to said second cache without writing said data to said lower level cache or to said main storage.

3. The memory cache system of claim 2 wherein said lower level cache maintains data in a queue from least to most recently used, and upon returning a pointer to a cache having a modified copy of specified data, said queue is updated to identify a copy of the specified data in the lower level cache as most recently used.

4. The memory cache system of claim 1 wherein said first and second caches maintain an indication of whether data stored in the first or second cache is shared or modified, and before writing over data which is shared, said first and second cache deliver a request for ownership to said lower level cache.

5. The memory cache system of claim 4 wherein said lower level cache maintains an indication of whether data stored in the lower level cache is shared, exclusive or modified, and said lower level cache requests ownership of specified data from a system bus attached to said main storage before granting a request for ownership of said specified data from said first or second cache, if said specified data is shared.

6. The memory cache system of claim 5 wherein said lower level cache requests ownership of specified data from a system bus attached to said main storage before responding to a request from said first or second cache to read data with intent to modify.

7. The memory cache system of claim 5 wherein, as part of granting a request for ownership of specified data from said first or second cache, and as part of delivering data to a first or second cache in response to a request to read specified data with intent to modify, said lower level cache instructs all other caches having unmodified copies of the specified data to flush the specified data.

8. The memory cache system of claim 5 wherein said lower level cache marks specified data as modified whenever a request for ownership of the specified data has been granted to said first or second cache, or said specified data has been delivered to said first or second cache in response to a request to read the specified data with intent to modify.

9. The memory cache system of claim 1 wherein said lower level cache, as part of removing specified data due to aging, or due to loss of ownership of specified data to another processor complex, instructs any cache having an unmodified copy of the specified data to flush the unmodified copy specified data.

10. The memory cache system of claim 1 wherein said lower level cache, as part of removing specified data due to aging, or due to loss of ownership of specified data to another processor complex, instructs any of said first and second caches having a modified copy of the specified data to write the modified copy of the specified data to main storage, and flush the specified data.

11. The memory cache system of claim 1 wherein said lower level cache, in response to a request from another processor complex to read specified data, instructs any cache having a modified copy of the specified data to write the modified copy of the specified data to main storage, and to said lower level cache.

12. A method of managing a cache system comprising first and second caches, respectively connected between a shared lower level storage system and first and second processors, and receiving from the connected processor memory access commands identifying data to be stored in said lower level storage system or data to be loaded from said lower level storage system, wherein said shared lower level storage system comprises a lower level cache and a main storage, said lower level cache maintaining copies of data in main storage and an indication of whether the first or second caches are storing copies of data, and whether those copies have been modified, the method comprising:

loading data from and storing data to said lower level storage system in response to said memory access commands, and upon receipt from said first cache of a request for data that has been modified by said second processor and is stored in modified form in said second cache, as indicated in said lower level storage system, causing said second cache to transfer said data to said first cache without returning said data to said shared lower level storage system, whereby the effect of repeated writes to the same data by the first and second processors is ameliorated.

13. The method of claim 12 wherein upon receiving a request for specified data from said first or second cache, responding to said request in said lower level cache by determining whether one of said first or second caches is storing a modified copy of said specified data.

14. The method of claim 13 wherein said lower level cache maintains data in a queue from least to most recently used, and upon determining that one of said first or second caches is storing a modified copy of specified data, said queue is updated to identify a copy of the specified data in the lower level cache as most recently used.

15. The method of claim 12 wherein said first and second caches maintain an indication of whether data stored in the first or second cache is shared or modified, and further comprising, before writing over data which is shared, delivering a request for ownership to said lower level cache.

16. The method of claim 15 wherein said lower level cache maintains an indication of whether data stored in the lower level cache is shared, exclusive or modified, and further comprising, before granting a request for ownership of specified data from said first or second cache, if said specified data is shared, requesting ownership of specified data from a system bus attached to said main storage.

17. The method of claim 16 further comprising requesting ownership of specified data from a system bus attached to said main storage before responding to a request from said first or second cache to read data with intent to modify.

18. The method of claim 16 further comprising, as part of granting a request for ownership of specified data from said first or second cache, and as part of delivering data to a first or second cache in response to a request to read specified data with intent to modify, instructing all other caches having unmodified copies of the specified data to flush the specified data.

19. The method claim 16 further comprising, marking specified data in said lower level cache as modified whenever a request for ownership of the specified data has been granted to said first or second cache, or said specified data has been delivered to said first or second cache in response to a request to read the specified data with intent to modify.

20. The method of claim 12 further comprising, as part of removing specified data from said lower level cache due to aging, or due to loss of ownership of specified data to another processor complex, instructing any cache having an unmodified copy of the specified data to flush the unmodified copy specified data.

21. The method of claim 12 further comprising, as part of removing specified data from said lower level cache due to aging, or due to loss of ownership of specified data to another processor complex, instructing any cache having a modified copy of the specified data to write the modified copy of the specified data to main storage, and flush the specified data.

22. The method of claim 12 further comprising, in response to a request from another processor complex to read specified data, instructing any cache having a modified copy of the specified data to write the modified copy of the specified data to main storage, and to said lower level cache.

* * * * *